(12) United States Patent
Hu et al.

(10) Patent No.: US 12,032,816 B2
(45) Date of Patent: Jul. 9, 2024

(54) DISPLAY OF SUBTITLE ANNOTATIONS AND USER INTERACTIONS

(71) Applicant: BEIJING ZITIAO NETWORK TECHNOLOGY CO., LTD., Beijing (CN)

(72) Inventors: Shijia Hu, Beijing (CN); Kojung Chen, Beijing (CN); Mengyuan Xiong, Beijing (CN); Cheng Qian, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/818,959

(22) Filed: Aug. 10, 2022

(65) Prior Publication Data
US 2022/0382445 A1    Dec. 1, 2022

Related U.S. Application Data

(63) Continuation of application No. PCT/CN2021/130619, filed on Nov. 15, 2021.

(30) Foreign Application Priority Data

Nov. 18, 2020  (CN) .......................... 202011296626.3

(51) Int. Cl.
G06F 3/04847 (2022.01)
G06F 3/0481 (2022.01)
(Continued)

(52) U.S. Cl.
CPC ........ G06F 3/04847 (2013.01); G06F 3/0481 (2013.01); G06F 3/165 (2013.01);
(Continued)

(58) Field of Classification Search
CPC .... G06F 3/0481; G06F 3/04847; G06F 3/165; G06F 16/438; G06F 16/48; G06F 40/166; G06F 40/58
See application file for complete search history.

(56) References Cited

U.S. PATENT DOCUMENTS 7,124,164 B1 * 10/2006 Chemtob ............ H04L 12/1822
                                                  709/204
7,213,051 B2 *  5/2007 Zhu ..................... H04L 12/1831
                                                  709/248
(Continued)

FOREIGN PATENT DOCUMENTS

CN    104539980 A    4/2015
CN    104967910 A    10/2015
(Continued)

OTHER PUBLICATIONS

English Translation of Written Opinion of International Searching Authority of PCT/CN2021/130619 (Year: 2022).*
(Continued)

*Primary Examiner* — Eric J. Bycer

(57) ABSTRACT

A multimedia interaction method, apparatus, a device, and a medium are provided. The method includes: receiving a triggering operation of a user for a subtitle interaction aggregation identifier on a multimedia display interface, where the multimedia display interface displays a multimedia, a subtitle content for the multimedia, and the subtitle interaction aggregation identifier; and displaying at least one subtitle interaction content corresponding to the subtitle interaction aggregation identifier, where the subtitle interaction content indicates an interaction content for the subtitle content. With the technical solution, since the subtitle interaction aggregation identifier is an aggregated representation of multiple subtitle interaction contents, multiple subtitle interaction contents for the subtitle content of the
(Continued)

multimedia may be displayed quickly by a triggering based on the subtitle interaction aggregation identifier, which improves display efficiency for the subtitle interaction content.

24 Claims, 5 Drawing Sheets

(51) Int. Cl.
    *G06F 3/16*           (2006.01)
    *G06F 16/438*       (2019.01)
    *G06F 16/48*         (2019.01)
    *G06F 40/166*       (2020.01)
    *G06F 40/279*       (2020.01)
    *G06F 40/58*         (2020.01)

(52) U.S. Cl.
    CPC ............ *G06F 16/438* (2019.01); *G06F 16/48* (2019.01); *G06F 40/166* (2020.01); *G06F 40/279* (2020.01); *G06F 40/58* (2020.01)

(56) References Cited

U.S. PATENT DOCUMENTS

| | | | | |
|---|---|---|---|---|
| 7,487,210 | B2* | 2/2009 | Ludwig | G06F 15/16 709/204 |
| 7,716,376 | B1* | 5/2010 | Price | G06F 1/12 709/248 |
| 10,033,676 | B2* | 7/2018 | Miyamoto | G06F 40/169 |
| 11,050,976 | B2* | 6/2021 | Hegde | H04N 21/47 |
| 2004/0021685 | A1* | 2/2004 | Denoue | G06F 16/40 715/721 |
| 2004/0098754 | A1* | 5/2004 | Vella | H04N 21/4722 725/135 |
| 2004/0125133 | A1* | 7/2004 | Pea | H04N 21/84 707/E17.013 |
| 2007/0266304 | A1* | 11/2007 | Fletcher | G06F 40/169 715/230 |
| 2007/0271331 | A1* | 11/2007 | Muth | G11B 27/34 707/E17.121 |
| 2008/0313570 | A1* | 12/2008 | Shamma | G11B 27/34 715/846 |
| 2009/0007200 | A1* | 1/2009 | Amento | H04N 21/4788 725/100 |
| 2009/0164904 | A1* | 6/2009 | Horowitz | G06F 16/739 715/723 |
| 2009/0193032 | A1* | 7/2009 | Pyper | G06Q 30/02 |
| 2009/0249223 | A1* | 10/2009 | Barsook | H04N 7/15 715/753 |
| 2010/0199182 | A1* | 8/2010 | Lanza | H04N 7/17318 715/723 |
| 2011/0252023 | A1* | 10/2011 | Santamaria | G06Q 10/107 715/752 |
| 2013/0086051 | A1* | 4/2013 | Brahms | H04N 21/47 707/723 |
| 2014/0143218 | A1* | 5/2014 | Sanghavi | G06F 16/48 707/695 |
| 2014/0201631 | A1* | 7/2014 | Pornprasitsakul | G11B 27/031 715/716 |
| 2015/0032697 | A1* | 1/2015 | Abdo | G06F 16/2365 707/634 |
| 2016/0284354 | A1* | 9/2016 | Chen | H04N 7/15 |
| 2016/0295294 | A1 | 10/2016 | Lan et al. | |
| 2017/0316792 | A1* | 11/2017 | Chaudhuri | G10L 19/022 |
| 2018/0211552 | A1* | 7/2018 | Samuelson | G06F 16/7844 |
| 2019/0379943 | A1 | 12/2019 | Ayala | |
| 2020/0273493 | A1* | 8/2020 | Huber | G11B 27/34 |
| 2021/0056251 | A1* | 2/2021 | Parmar | G06F 3/04847 |
| 2021/0067836 | A1* | 3/2021 | Hornsby | H04N 21/4394 |
| 2022/0030286 | A1* | 1/2022 | Muthiah | H04N 21/8133 |

FOREIGN PATENT DOCUMENTS

| | | |
|---|---|---|
| CN | 106303723 A | 1/2017 |
| CN | 108174023 A | 6/2018 |
| CN | 110134479 A | 8/2019 |
| CN | 110650378 A | 1/2020 |
| CN | 110719518 A | 1/2020 |
| CN | 111836112 A | 10/2020 |
| CN | 113010698 A | 6/2021 |
| IN | 2014CHE2014 A * | 2/2014 |
| WO | WO2005071660 A1 | 8/2005 |

OTHER PUBLICATIONS

Search Report for PCT No. PCT/CN2021/130619 dated Feb. 10, 2022 (11 Pages).

* cited by examiner

DISPLAY OF SUBTITLE ANNOTATIONS AND USER INTERACTIONS

This application is a continuation of International Application No. PCT/CN2021/130619, filed on Nov. 15, 2021, which claims priority to Chinese Patent Application No. 202011296626.3, titled "MULTIMEDIA INTERACTION METHOD, INFORMATION INTERACTION METHOD, APPARATUS, DEVICE, AND MEDIUM", filed on Nov. 18, 2020 with the China National Intellectual Property Administration, both of which are incorporated herein by reference in their entireties.

FIELD

The present disclosure relates to the field of multimedia technology, and in particular, to a multimedia interaction method, an information interaction method, an apparatus, a device and a medium.

BACKGROUND

With the continuous development of smart devices and video technology, playing audio and video with smart devices has increasingly become a necessary part in life.

When an audio or video is played, a user may synchronously browse a corresponding subtitle text to accurately understand relevant content of the audio or video. Currently, a subtitle for audio or video supports limited interaction functions with users, which cannot meet interaction requirements in various scenarios, resulting in poor user interaction experience.

SUMMARY

In order to solve the above technical problems or at least partially solve the above technical problems, a multimedia interaction method, an information interaction method, an apparatus, a device, and a medium are provided according to the present disclosure.

A multimedia interaction method is provided according to an embodiment of the present disclosure. The method includes:
  receiving a triggering operation of a user for a subtitle interaction aggregation identifier on a multimedia display interface, wherein the multimedia display interface displays a multimedia, subtitle content of the multimedia, and the subtitle interaction aggregation identifier; and
  displaying at least one subtitle interaction content corresponding to the subtitle interaction aggregation identifier, where the subtitle interaction content indicates an interaction content for the subtitle content.

A multimedia interaction method is further provided according to an embodiment of the present disclosure. The method includes:
  receiving an interaction input triggering operation, wherein an interactive input to a multimedia and/or an interactive input to subtitle content of a multimedia are triggered by the interactive input triggering operation;
  obtaining interactive input data triggered based on the interaction triggering operation; and
  displaying, in the multimedia and the subtitle content, the interactive input data in association with the multimedia and the subtitle content.

An information interaction method is further provided according to an embodiment of the present disclosure. The method includes:
  obtaining interaction content for a selected text in text content from a user; and
  displaying an interaction aggregation identifier in association with a text segment comprising the selected text, wherein the text content comprises at least one text segment, and the text segment comprising the interaction content is in a one-to-one correspondence with the interaction aggregation identifier.

A multimedia interaction apparatus is further provided according to an embodiment of the present disclosure. The apparatus includes: a triggering module and an interaction content display module.

The triggering module is configured to receive a triggering operation of a user for a subtitle interaction aggregation identifier on a multimedia display interface, wherein the multimedia display interface displays a multimedia, subtitle content of the multimedia, and the subtitle interactive aggregation identifier.

The interaction content display module is configured to display at least one subtitle interaction content corresponding to the subtitle interaction aggregation identifier, wherein the subtitle interaction content indicates interaction content for the subtitle content.

A multimedia interaction apparatus is further provided according to an embodiment of the present disclosure. The apparatus includes: an interaction input triggering module, an interaction data obtaining module and an interaction data displaying module.

The interactive input triggering module is configured to receive an interaction input triggering operation, wherein an interaction input to a multimedia and/or an interaction input to subtitle content of a multimedia are triggered by the interactive input triggering operation.

The interaction data obtaining module is configured to obtain interaction input data triggered based on the interaction triggering operation.

The interaction data displaying module is configured to display, in the multimedia and the subtitle content, the interaction input data in association with the multimedia and the subtitle content.

An information interaction apparatus is further provided according to an embodiment of the present disclosure. The apparatus includes: an interaction obtaining module and an identifier display module.

The interaction obtaining module is configured to obtain interaction content for a selected text in text content from a user.

The identifier display module is configured to display an interaction aggregation identifier in association with a text segment comprising the selected text, wherein the text content comprises at least one text segment, and the text segment comprising the interactive content is in a one-to-one correspondence with the interaction aggregation identifier.

An electronic device is further provided according to an embodiment of the present disclosure. The electronic device includes a processor, and a memory. The memory is configured to store executable instructions of the processor. The processor is configured to read the executable instructions from the memory, and execute instructions to perform the multimedia interaction method and/or the information interaction method according to any one of the embodiments of the present disclosure.

A computer-readable storage medium is further provided according to an embodiment of the present disclosure. The storage medium stores a computer program, and the computer program is used to perform the multimedia interaction method and/or the information interaction method according to any one of the embodiments of the present disclosure.

Compared with the conventional technology, the technical solution provided in the embodiments of the present disclosure has advantages as below. In the multimedia interaction solution provided in the embodiments of the present disclosure, a triggering operation of a user for a subtitle interaction aggregation identifier on a multimedia display interface is received. The multimedia display interface displays a multimedia, subtitle content of the multimedia, and the subtitle interaction aggregation identifier. At least one subtitle interaction content corresponding to the subtitle interaction aggregation identifier is displayed. The subtitle interaction content indicates interaction content for the subtitle content. With the technical solution, since the subtitle interaction aggregation identifier is an aggregated representation of multiple subtitle interaction contents, a triggering based on the subtitle interaction aggregation identifier can lead to quickly displaying of multiple subtitle interaction contents for the subtitle content of the multimedia, which improves efficiency in displaying the subtitle interaction content. The subtitle interaction aggregation identifier, when not triggered, is displayed as only a single identifier. Compared with the conventional display method, the display may be performed according to a user choice in the multimedia interaction method of the present disclosure. Thus, the multimedia interaction method of the present disclosure is more flexible and has a better display effect.

BRIEF DESCRIPTION OF THE DRAWINGS

The above and other features, advantages and aspects of various embodiments of the present disclosure will become more apparent when taken in conjunction with the accompanying drawings and with reference to the following detailed embodiments. Same reference numerals in the drawings indicate the same or similar elements. It should be understood that the drawings are illustrative, and the components and elements are not necessarily drawn to scale.

DETAILED DESCRIPTION

Figure 1:
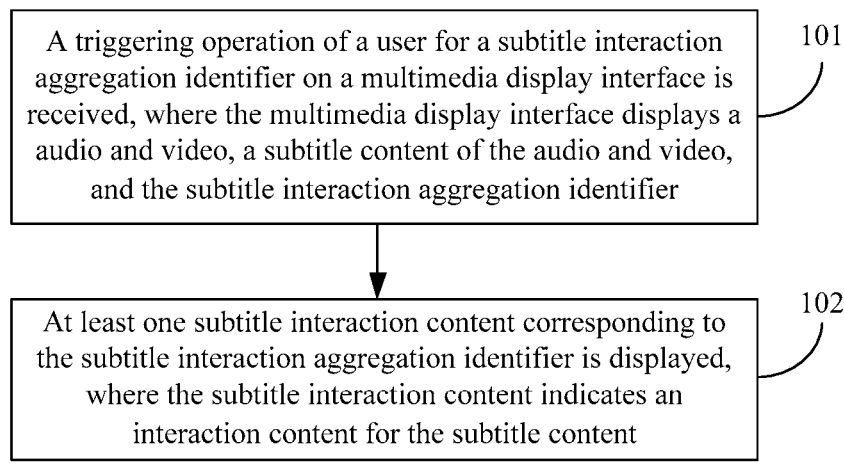
FIG. 1 is a schematic flowchart of a multimedia interaction method according to an embodiment of the present disclosure.

Embodiments of the present disclosure are described in more detail below with reference to the accompanying drawings. Although some embodiments of the present disclosure are shown in the drawings, it should be understood that the present disclosure may be implemented in various forms and should not be construed as limited to the embodiments set forth herein, and the embodiment are provided for a purpose of a more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

Term "include" and variations thereof used herein refer to an open-ended inclusion, i.e., "include but is not limited to". Term "based on" means "based at least in part on." Term "an embodiment" means "at least one embodiment". Term "another embodiment" means "at least one additional embodiment". Term "some embodiments" means "at least some embodiments". Relevant definitions of other terms are given in the description below.

It should be noted that concepts such as "first" and "second" mentioned in the present disclosure are only used to distinguish different devices, modules or units from each other, and are not intended to limit an order or interdependence of functions performed by these devices, modules or units.

It should be noted that the modifying expressions of "one" and "a plurality of" mentioned in the present disclosure are illustrative rather than limiting, and those skilled in the art should understand that unless indicated in the context clearly otherwise, the expressions should be understood as "one or more".

In the embodiments of the present disclosure, names of messages and information exchanged among multiple devices are only for illustrative purposes, which not be intended to limit the scope of these messages or information.

FIG. 1 is a schematic flowchart of a multimedia interaction method according to an embodiment of the present disclosure. The method may be performed through a multimedia interaction apparatus implemented by software and/or hardware, which may generally be integrated in an electronic device. As shown in FIG. 1, the method includes steps 101 to 102.

In step 101, a triggering operation of a user for a subtitle interaction aggregation identifier on a multimedia display interface is received, where the multimedia display interface displays a multimedia, subtitle content of the multimedia, and the subtitle interaction aggregation identifier.

The multimedia display interface is an interface on which various types of multimedia information are displayed. The multimedia and subtitle content are displayed in different areas on the multimedia display interface. That is, some areas, such as a multimedia area and a subtitle area, may be provided in the multimedia display interface, to display the multimedia, the subtitle content of the multimedia and the subtitle interactive aggregation identifier. The multimedia may include an audio and/or video, which will not be specifically limited. The subtitle interaction aggregation identifier is a prompt identifier that a user provides interaction content for a subtitle. The prompt identifier is an aggregation identifier which may correspond to one or more interaction contents.

When the multimedia display interface is viewed by a user, a triggering operation of the user for a subtitle interaction aggregation identifier existed on the multimedia display interface may be received. The triggering operation may specifically include various operations. For example, it may be determined that the triggering operation is received when the user performs a click operation or a hovering operation on the subtitle interaction aggregation identifier.

In an embodiment of the present disclosure, before the step of receiving a triggering operation of a user for a subtitle interaction aggregation identifier on a multimedia display interface, the multimedia interaction method may further include: in response to that a subtitle interaction content input by the user for a target subtitle in the subtitle content is obtained, displaying the subtitle interaction aggregation identifier on the multimedia display interface. When an interaction input triggering operation of the user for the target subtitle of the subtitle content on the multimedia display interface is received, an interaction input interface including an interaction component may be displayed to the user, and the subtitle interaction content input by the user may be obtained through the interaction component. There may be multiple interaction components, which may include a comment component and/or a sticker component. Correspondingly, the subtitle interaction content may include a subtitle comment and/or a subtitle sticker. After the subtitle interaction content is obtained, the subtitle interaction aggregation identifier may be set on the multimedia display interface and presented to the user. The target subtitle may be distinctively displayed in a set way. The set way may be any feasible presentation manner for distinguishing the target subtitle from other parts of the subtitle content. For example, the set way may include, but is not limited to, at least one of adding a background color, bold font, and adding an underline.

Figure 2:
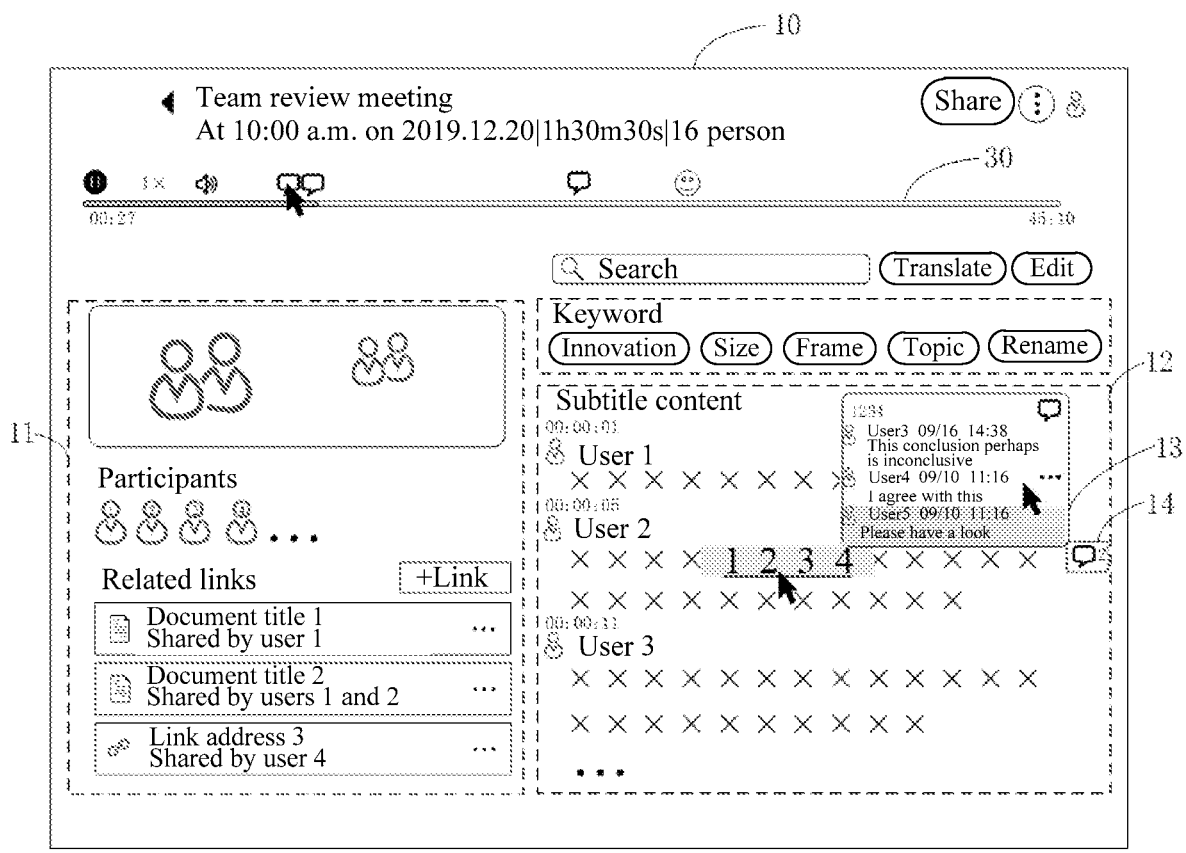
FIG. 2 is a schematic diagram of a multimedia display interface according to an embodiment of the present disclosure.

In an example, FIG. 2 is a schematic diagram of a multimedia display interface according to an embodiment of the present disclosure. As shown in FIG. 2, a playback timeline 30 of an audio may be displayed in an upper area of the multimedia display interface 10. The multimedia display interface 10 may include a first area 11 and a second area 12. The subtitle content is displayed in the second area 12, in which text "1234" with a background color and underline is the target subtitle currently selected by the user. FIG. 2 shows comments on the target subtitle inputted from a user 3 and a user 4, saying "This conclusion should be inconclusive" and "I agree with this".

Relevant information of the current audio may be displayed in the first area 11. In FIG. 2, a relevant image or a current video of the current audio is displayed in an upper area of the first area 11, and participant information is presented below the image or video. In FIG. 2, avatars of participants are displayed. Three related links are displayed in a lower area of the first area 11, each of which includes a title and a link source. For example, a first related link directs to a document with a title 1 shared by the user 1. A current user may click a link add button on the right, to add more related links based on an actual situation. In FIG. 2, the title "Team Review Meeting" of the multimedia and other related contents are displayed in the upper area of the multimedia display interface 10. In FIG. 2, "10:00 a.m. on Dec. 20, 2019" indicates a starting time instant of the multimedia, and "1 h30 m30 s" indicates a duration of the multimedia is 1 hour, 30 minutes and 20 seconds, and "16" indicates the number of participants.

The subtitle content may be obtained, for example, by recognizing the multimedia. Specifically, automatic speech recognition (ASR) technology may be used to recognize the multimedia to obtain speech information. Then, the speech information is converted into a text content, to obtain the subtitle content. The speech recognition technology is not specifically limited in the embodiments of the present disclosure, and a random model method or artificial neural network method may be applied, for example. The subtitle content may include at least two subtitle segments, which are obtained by performing semantic split on the subtitle content. In an embodiment, one or more subtitle segments may be obtained, by performing semantic split on the subtitle content. Each of the subtitle segments may include a part of the subtitle content. The number of subtitle segments is not specifically limited.

In an embodiment of the present disclosure, a process of displaying the subtitle interaction aggregation identifier on the multimedia display interface includes: displaying, on the multimedia display interface, the subtitle interaction aggregation identifier in association with a subtitle segment including the target subtitle. One subtitle segment including the subtitle interaction content corresponds to one subtitle interaction aggregation identifier. The subtitle interaction aggregation identifier includes the number of the subtitle interaction content for the associated subtitle segment. The subtitle interaction content includes a comment and/or a sticker. In an example, the method may further include: displaying, in the case where at least two consecutive subtitle segments include the same target subtitle, at least two subtitle interaction aggregation identifiers respectively at the at least two consecutive subtitle segments.

Since the subtitle content may include one or more subtitle segments, the subtitle interaction aggregation identifier may be displayed on the multimedia display interface, in association with the subtitle segments including the target subtitle. The number of target subtitles may be one or more. In the case of one target subtitle, the target subtitle may be included in one subtitle segment or in at least two consecutive subtitle segments. Corresponding subtitle interaction aggregation identifiers are respectively displayed at the at least two consecutive subtitle segments. In the case of two or more target subtitles, the target subtitles may be included in one subtitle segment, or in multiple different non-consecutive subtitle segments. Corresponding subtitle interaction aggregation identifiers are displayed at each of the subtitle segments including the target subtitles. A position of the subtitle interaction aggregation identifier is not specifically limited, and may be set based on an actual situation. For example, when the subtitle segments including the target subtitles are a first subtitle segment and a third subtitle segment, two subtitle interaction aggregation identifiers may be respectively displayed in association with the first subtitle segment and the third subtitle segment, and other subtitle segments are not displayed with the subtitle interaction aggregation identifier. In an example, since the number of subtitle interaction content is one or more, the number of subtitle interaction content included in an associated subtitle segment may be displayed in the subtitle interaction aggregation identifier.

In an embodiment, referring to FIG. 2, the subtitle content in the second area 12 includes three subtitle segments, and the user 3 and the user 4 comments on the target subtitle "1234". The subtitle segment including the target subtitle "1234" is the second subtitle segment, that is, the subtitle segment below the user 2. Therefore, the subtitle interaction aggregation indicator 14 is associated and displayed on the right side of the first line of text in the second subtitle segment, and the number "2" in the subtitle interaction aggregation identifier 14 indicates that there are two subtitle interaction contents, that is, two comments. The display position of the subtitle interaction aggregation identifier 14 in FIG. 2 is merely an example, and other positions that may be displayed in association with the subtitle segment are also possible. For example, the subtitle interaction aggregation identifier 14 may be displayed on the left side of the first line of text in the second subtitle segment.

In step 102, at least one subtitle interaction content corresponding to the subtitle interaction aggregation identifier is displayed, where the subtitle interaction content indicates an interaction content for the subtitle content.

As described above, the subtitle interaction content is an interaction content that is previously inputted for a part of subtitle in the subtitle content, and may specifically include a comment and/or a sticker. The number and publishers of subtitle interaction contents are not limited in the embodiments of the present disclosure.

One or more subtitle interactions corresponding to the subtitle interaction aggregation identifier may be displayed after the triggering operation of the user for the subtitle interaction aggregation identifier is received. In an example, a process of displaying at least one subtitle interaction content corresponding to the subtitle interaction aggregation identifier may include: displaying, in a subtitle interaction window on the multimedia display interface, at least one subtitle interaction content of the subtitle segment associated with the subtitle interaction aggregation identifier.

The subtitle interaction window is a window for displaying the subtitle interaction content, in which the subtitle interaction content corresponding to the subtitle interaction aggregation identifier may be changed from a hidden state to an expanded state for display. The subtitle interaction window may be displayed in association with the subtitle interaction aggregation identifier. That is, the subtitle interaction window may be displayed near the position of the subtitle interaction aggregation identifier. After the triggering operation of the user for the subtitle interaction aggregation identifier is received, the subtitle interaction window may be displayed in association with the subtitle interaction aggregation identifier, and the subtitle interaction content may be displayed in the subtitle interaction window.

In an embodiment, referring to FIG. 2, an arrow in the subtitle content may indicate the triggering operation of the user for the subtitle interaction aggregation identifier 14. The subtitle segment associated with the subtitle interaction aggregation identifier 14 is the second subtitle segment in FIG. 2, and corresponding comments from the user 3 and the user 4 are displayed in the subtitle interaction window 13 together with release times of the two comments. The user 3 posted a comment at 14:38 on September 16th, and the user 4 posted a comment at 11:16 on September 10th.

In an example, the multimedia interaction method in an embodiment of the present disclosure may further include: displaying at least one multimedia interaction content in the subtitle interaction window, where the multimedia interaction content corresponds to a time period corresponding to a subtitle segment associated with the subtitle interaction aggregation identifier. The multimedia interaction content includes an interaction content for a multimedia which is obtained based on a playback timeline of the multimedia.

The multimedia interaction content, different from the subtitle interaction content, is an interaction content of the user for the multimedia. The interaction content may be inputted based on the playback timeline of the multimedia. The multimedia interaction content may include a comment and/or a sticker, which is not specifically limited. For example, when the video is played, the user may input a comment or sticker for the current video frame by triggering an displayed interaction component on the playback timeline of the video. In an embodiment of the present disclosure, the subtitle interaction aggregation identifier may correspond to the multimedia interaction content included in the multimedia time period of the associated subtitle segment. After the triggering operation of the user for the subtitle interaction aggregation identifier is received, a corresponding multimedia interaction content may be also displayed in the subtitle interaction window.

In an example, both the subtitle interaction content and the multimedia interaction content may be displayed in the subtitle interaction window simultaneously, and may be distinguished from each other in various manners, which are not limited in the embodiments of the present disclosure. For example, two areas may be set to display the subtitle interaction content and the multimedia interaction content respectively. Alternatively, different identifiers may be added to represent the subtitle interaction content and the multimedia interaction content. In an example, in addition to the number of the subtitle interaction content for the associated subtitle segment, the subtitle interaction aggregation identifier may further include the number of the multimedia interaction content in the time period corresponding to the associated subtitle segment. A sum of the number of the subtitle interaction content and the number of the multimedia interaction content may be displayed in the subtitle interaction aggregation identifier. Alternatively, the number of the subtitle interaction content and the number of the multimedia interaction content may be displayed in the subtitle interaction aggregation identifier separately.

In an example, the multimedia interaction method may further include: receiving a triggering operation of the user for a selected subtitle in the subtitle content; and displaying, in a subtitle interaction window on the multimedia display interface, the subtitle interaction content of the selected subtitle or the subtitle interaction content of the subtitle segment including the selected subtitle. The selected subtitle is a subtitle with the subtitle interaction content, that is, one of the multiple target subtitles including the subtitle interaction content. The selected subtitle is distinctively displayed to the user. When the user triggers the selected subtitle including the subtitle interaction content, the subtitle interaction content corresponding to the selected subtitle may be displayed in the subtitle interaction window. Alternatively, all subtitle interaction contents of the subtitle segment including the selected subtitle are displayed in the subtitle interaction window, in which the subtitle interaction content of the selected subtitle is included. The subtitle interaction window is jumped to the position of the subtitle interaction content corresponding to the selected subtitle. A hidden subtitle interaction content may be displayed by triggering the subtitle with the subtitle interaction content, which provides more ways for displaying the subtitle interaction content.

In an embodiment, referring to FIG. 2, the target subtitle "1234" is considered as the selected subtitle after the user 3 and the user 4 comment the target subtitle "1234". When the selected subtitle is triggered by the user, the subtitle interaction contents from the user 3 and the user 4 may be displayed in the subtitle interaction window 13. It may be understood that only the subtitle interaction content of a currently selected subtitle or the subtitle interaction content of the entire subtitle segment may be displayed on the subtitle interaction window 13. When too many subtitle interaction contents are displayed in the subtitle interaction window 13, the subtitle interaction content in the subtitle interaction content window 13 may be jumped to the position of the subtitle interaction content corresponding to the selected subtitle, to display distinctively.

With the multimedia interaction solution provided in the embodiments of the present disclosure, a triggering operation of a user for a subtitle interaction aggregation identifier on a multimedia display interface is received. The multimedia display interface displays a multimedia, a subtitle content for the multimedia, and the subtitle interaction aggregation identifier. At least one subtitle interaction content corresponding to the subtitle interaction aggregation identifier is displayed. The subtitle interaction content indicates an interaction content for the subtitle content. With the above technical solution, since the subtitle interaction aggregation identifier is an aggregate representation of multiple subtitle interaction contents, a triggering based on the subtitle interaction aggregation identifier may realize quickly displaying of multiple subtitle interaction contents for the subtitle content of the multimedia, which improves efficiency in displaying the subtitle interaction content. The subtitle interaction aggregation identifier, when not triggered, is displayed as only a single identifier. Compared with the conventional display method, the display may be performed according to a user choice in the multimedia interaction method of the present disclosure. Thus, the multimedia interaction method of the present disclosure is more flexible and has a better display effect.

In an actual usage scenario, multimedia data is associated with subtitle data, and an interaction, for example providing feedback such as comment, may be performed by the user on a subtitle data display interface. Alternatively, the interaction for the played multimedia data may be performed on a multimedia data playback area (such as a video playback area or audio playback area). The interactions are actually for the same or related information source. By presenting the obtained interactive input in association with the multimedia data and the subtitle data, information of the interactive input may be communicated and presented in an easier manner. In this way, the interactive input inputted by the user in the subtitle data may be presented when a multimedia file associated with the subtitle data is played, which facilitates viewing. Alternatively, the interactive input inputted by the user in the multimedia data playback interface may be viewed on a display interface of the subtitle data associated with the multimedia data. In this way, the user interaction is more convenient, the interaction content may be easily inputted in different scenarios, and the interaction content may not be lost when viewing in other scenarios, leading to a better effect of information communication. For example, an interaction inputted for the subtitle content in a reading mode (a mode for mainly reading the subtitle content, for example) may be viewed in a playback scene, or an interaction content inputted in a playback mode may be presented in the reading mode on the subtitle data display interface.

In some embodiments, the multimedia interaction method may further include: receiving a triggering operation of the user for a subtitle interaction prompt identifier on a playback timeline of the multimedia on the multimedia display interface; and displaying the subtitle interaction content corresponding to the subtitle interaction prompt identifier in a subtitle interaction window. In an example, one subtitle interaction prompt identifier corresponds to at least one subtitle interaction content of an associated subtitle, where the associated subtitle indicates a subtitle at an associated time point in association with the subtitle interaction prompt identifier or a subtitle during an associated time period in association with the subtitle interaction prompt identifier.

The subtitle interaction prompt identifier is set after the user inputs the interaction content for the subtitle content and is used to prompt that the position includes subtitle interaction content. The subtitle interaction prompt identifier and the subtitle interaction aggregation identifier may be presented in a same manner or in different manners, which may be set based on an actual situation. Since the subtitle interaction prompt identifier is set on the playback timeline of the multimedia, the subtitle interaction prompt identifier may be associated with an associated time point on the playback timeline, or may be associated with an associated time period on the playback timeline. When the subtitle interaction prompt identifier is associated with the associated time point, the associated subtitle corresponding to the subtitle interaction prompt identifier is a subtitle corresponding to the associated time point. When the subtitle interaction prompt identifier is associated with the associated time period, the associated subtitle corresponding to the subtitle interaction prompt identifier is a subtitle corresponding to the associated time period. Therefore, one subtitle interaction prompt identifier corresponds to the above-mentioned subtitle interaction content for an associated subtitle, and there may be at least one subtitle interaction content.

According to an embodiment, after the triggering operation of the user for the subtitle interaction prompt identifier on the playback timeline of the multimedia on the multimedia display interface is received, the subtitle interaction content corresponding to the subtitle interaction prompt identifier may be displayed in the subtitle interaction window. The subtitle interaction window may also be displayed in association with the above-mentioned subtitle interaction aggregation identifier.

In addition, in an embodiment of the present disclosure, the user may input a multimedia interaction content for the multimedia based on the playback timeline of the multimedia. A multimedia interaction prompt identifier corresponding to the multimedia interaction content may be displayed on the playback timeline, in order to prompt the user that there is a multimedia interaction content at the position. It may be understood that the multimedia interaction prompt identifier the subtitle interaction prompt identifier are displayed in different manners, so as to distinguish different interaction content prompts. The subtitle interaction content may be displayed in the subtitle interaction window when the subtitle interaction prompt identifier is triggered by the user. The multimedia interaction content may be displayed in an interactive card associated with the playback timeline, when the multimedia interaction prompt identifier is triggered by the user.

In an embodiment, referring to FIG. 2, in the multimedia display interface 10, four subtitle interaction prompt identifiers are displayed on the playback timeline 30 of an audio. The four subtitle interaction prompt identifiers include three comment identifiers and one sticker identifier, which are shown as examples only. The mouse pointer on the first subtitle interaction prompt identifier from the left may indicate the triggering operation of the user for the subtitle interaction prompt identifier. The triggering operation may be in various forms, such as a click by the user on the subtitle interaction prompt identifier. The associated time period in association with the first subtitle interaction prompt identifier corresponds to the second subtitle segment in the subtitle content. Therefore, after the triggering operation, all subtitle interaction contents of the second subtitle segment may be displayed in the subtitle interaction window 13.

In the above solution, based on the triggering operation for the subtitle interaction prompt identifier on the playback timeline of the multimedia, the multimedia interaction content for the multimedia corresponding to the subtitle interaction prompt identifier may be expanded from a hidden state and displayed in the subtitle interaction window. The corresponding subtitle interaction content may be displayed by triggering the subtitle interaction aggregation identifier and the subtitle interaction prompt identifier, which further improves the effect in displaying the subtitle interaction content and realizes a more flexible displaying.

In an embodiment, after receiving the triggering operation of the user for the subtitle interaction prompt identifier on the playback timeline of the multimedia on the multimedia display interface, the method may further include: playing the multimedia, based on a timestamp of an associated subtitle corresponding to the subtitle interaction prompt identifier. In an example, after receiving the triggering operation of the user for the subtitle interaction prompt identifier on the playback timeline of the multimedia on the multimedia display interface, the method may further include: controlling the subtitle content of the multimedia to jump to a position of the associated subtitle corresponding to the subtitle interaction prompt identifier, and distinctively displaying the associated subtitle and the subtitle interaction content for the associated subtitle.

In an embodiment of the present disclosure, the subtitle content is obtained by performing a speech recognition on the multimedia. Each text in the subtitle content corresponds to speech information, and thereby corresponds to a timestamp in the multimedia. In an embodiment of the present disclosure, after the triggering operation of the user for the subtitle interaction prompt identifier on the playback timeline of the multimedia is received, a timestamp of an associated subtitle corresponding to the subtitle interaction prompt identifier may be determined, and the multimedia may be played based on the timestamp. In addition, the subtitle content displayed separately in the multimedia display interface may be controlled to jump to a position of the associated subtitle, and the associated subtitle and the subtitle interaction content of the associated subtitle may be distinctively displayed. In an example, in a subsequent playback process of the multimedia, subtitle sentences corresponding to the playback progress of the multimedia following the associated subtitle may be distinctively displayed in order. The subtitle interaction content of the associated subtitle is distinctively displayed in the subtitle interaction window. A form of distinctively displaying is not specifically limited in the embodiments of the present disclosure, which may include at least one of a highlight, bolding, and underlining, for example.

In the above solution, based on the triggering operation for the subtitle interaction prompt identifier on the playback timeline of the multimedia, parts in the multimedia and the subtitle content corresponding to the subtitle interaction prompt identifier may be associated and interacted, so that the user may better understand the contents associated with the subtitle interaction prompt identifier, which may better meet an interaction demand of the user and improve user experience in interaction.

In some embodiments, the multimedia interaction method may further include: receiving an interaction display triggering operation of the user for a position corresponding to a target time point on a playback timeline of the multimedia; and displaying an interactive card, wherein the interactive card includes subtitle interaction data corresponding to the target time point, and the subtitle interaction data includes the subtitle interaction content and/or statistical data of the subtitle interaction content. In an example, the interactive card further includes multimedia interaction data for the multimedia at the target time point, and the multimedia interaction data includes a multimedia interaction content and/or statistical data of the multimedia interaction content.

The target time point may be a moment on the playback timeline corresponding to the interaction display triggering operation, or a key time point closest to the moment on the playback timeline corresponding to the interaction display triggering operation. The key time point may be set on the playback timeline according to a preset rule. Since the user may input the multimedia interaction content for the multimedia based on the playback timeline of the multimedia, the multimedia interaction prompt identifier is displayed at a position of the target time point on the playback timeline, in order to prompt the user that there is a multimedia interaction content at the position. The multimedia interaction prompt identifier and the subtitle interaction prompt identifier are displayed in different manners, so as to distinguish different interaction content prompts.

The interaction display triggering operation refers to a triggering operation indicating that the user wants to display an interaction content for a current multimedia. In an embodiment of the present disclosure, the interaction display triggering operation may include a set operation on the playback timeline of a video or on a set button. The set operation includes a hover or a clicking. That is, the interaction display triggering operation may include a hover operation or a clicking operation on the playback timeline, or a hover operation or a clicking operation on the set button. The set button may be preset. A position and style of the button are not specifically limited, which may be set based on an actual situation.

The interactive card may be a card in which relevant interaction content for the multimedia may be displayed. A style of the interactive card is not specifically limited in the embodiments of the present disclosure. The subtitle interaction data indicates all interaction contents published for all users regarding a subtitle corresponding to the target time point. The subtitle interaction data may include the subtitle interaction content and/or statistical data of the subtitle interaction content. The statistical data of the subtitle interaction content may include at least one of the number of the subtitle interaction content, user information, release time, and the like. The multimedia interaction data indicates interaction contents published for the user regarding the multimedia corresponding to the target time point. The multimedia interaction data may include the multimedia interaction content and/or statistical data of the multimedia interaction content. The statistical data of the multimedia interaction content may include at least one of the number of the multimedia interaction content, user information, release time, and the like.

In an embodiment of the present disclosure, when the interaction display triggering operation of the user for a position on the playback timeline of the multimedia is received, the target time point of the position is determined, and the interactive card may be displayed. The interactive card may include the subtitle interaction data for the subtitle corresponding to the target time point and/or the multimedia interaction data for the multimedia at the target time point. In an example, when the interaction display triggering operation of the user for the multimedia interaction prompt identifier on the playback timeline is received, only the multimedia interaction data for the multimedia at the target time point is included in the interactive card.

In the above solution, relevant subtitle interaction data and/or multimedia interaction data may be displayed through an interactive card, when the triggering operation of the user for the timeline is performed, so that the user may understand various types of interaction data corresponding to a current time point on the timeline more intuitively. In this way, the displayed interaction data is more comprehensive and has strong pertinence, realizing a better display effect for the interaction data.

In some embodiments, the multimedia interaction method may further include: receiving a deletion operation of the user for a first subtitle segment in the subtitle content; and displaying, after the first subtitle segment is deleted, the subtitle interaction aggregation identifier corresponding to the first subtitle segment in an area associated with a historical position of the first subtitle segment.

The first subtitle segment is any subtitle segment. In an embodiment of the present disclosure, since the subtitle content may include at least two subtitle segments, each of the subtitle segments including the subtitle interaction content corresponds to one subtitle interaction aggregation identifier. When the deletion operation of the user for the first subtitle segment is received, the first subtitle segment may be deleted. If the first subtitle segment has an associated subtitle interaction aggregation identifier, the subtitle interaction aggregation identifier associated with the deleted first subtitle segment is displayed in the area associated with the historical position of the first subtitle segment. The location of the associated area is not specifically limited.

Figure 3:
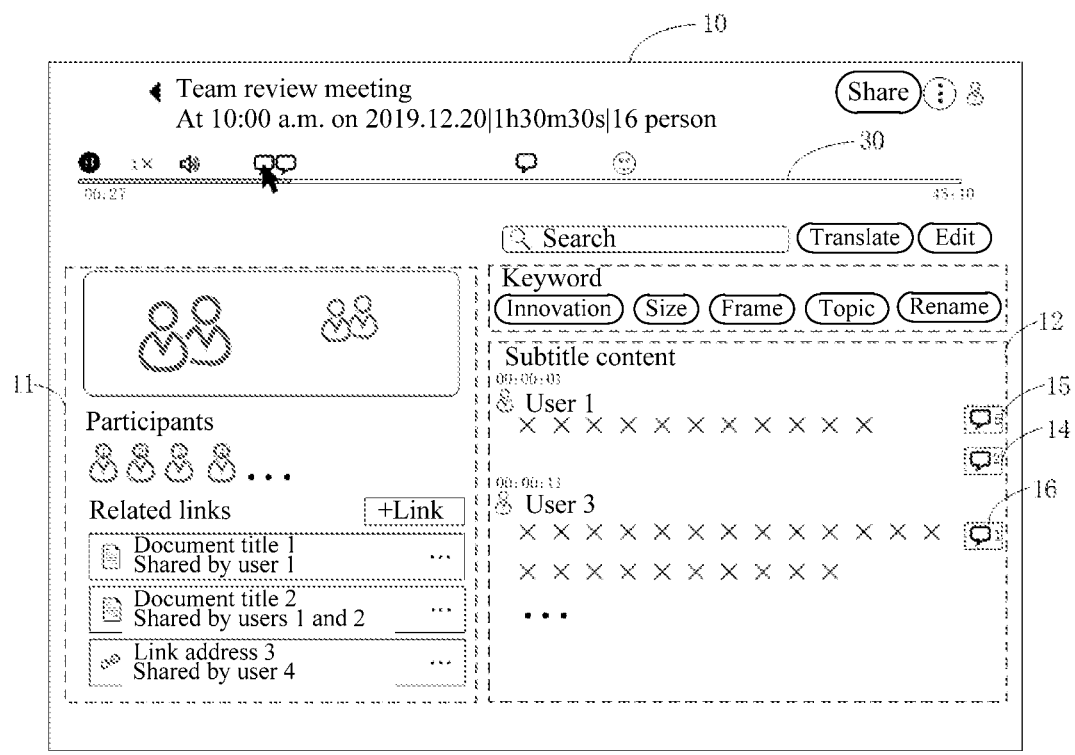
FIG. 3 is a schematic diagram of a multimedia display interface according to another embodiment of the present disclosure.

In an embodiment, FIG. 3 is a schematic diagram of a multimedia display interface according to an embodiment of the present disclosure. As shown in FIG. 2 and FIG. 3, the subtitle segment of the user 2 is deleted. Then, the subtitle interaction aggregation identifier 14 associated with this subtitle segment is displayed between the subtitle segment of the user 1 and the subtitle segment of the user 3, and also between the subtitle interaction aggregation identifier 15 associated with the subtitle segment of the user 1 and the subtitle interaction aggregation identifier 16 associated with the subtitle segment of the user 3. In addition, the subtitle interaction aggregation identifier 14 is displayed in association with the historical position of the subtitle segment of the user 2. The displayed position of the subtitle interaction aggregation identifier after the subtitle segment is deleted shown in FIG. 3 is only an example, which will not be limited.

In some embodiments, the multimedia interaction method may further include: receiving a splitting operation of the user for a second subtitle segment in the subtitle content, where the second subtitle segment is split into at least two subtitle sub-segments in the splitting operation; and splitting, based on the split subtitle sub-segments, the subtitle interaction content of the second subtitle segment. In an example, the multimedia interaction method may further include: deleting a historical subtitle interaction aggregation identifier of the second subtitle segment; and displaying a new subtitle interaction aggregation identifier in association with a sub-subtitle segment including the subtitle interaction content.

The second subtitle segment is any subtitle segment. After the splitting operation of the user for the second subtitle segment is received, the splitting operation is performed on the second subtitle segment to split the second subtitle segment into at least two subtitle sub-segments. Then, the subtitle interaction content of the second subtitle segment may be split based on the subtitle sub-segments. Moreover, after the second subtitle segment is split, the historical subtitle interaction aggregation identifier corresponding to the second subtitle segment may be deleted since the second subtitle segment no longer exists. A new subtitle interaction aggregation identifier may be displayed in association with the subtitle sub-segment including the subtitle interaction content. However, no subtitle interaction aggregation identifier may be displayed for the subtitle segment that does not include any subtitle interaction content.

In the above solution, with deletion of a subtitle segment, the subtitle interaction content for the subtitle segment may be retained, and the subtitle interaction aggregation identifier may be retained for a subsequent displaying of subtitle interaction content. With splitting of a subtitle segment, the subtitle interaction content for the subtitle segment is split accordingly, and a new subtitle interaction aggregation identifier is displayed for the subtitle segment based on an actual subtitle interaction content after the splitting. Displaying of the subtitle interaction content varies with actual operations of the user, having a higher flexibility.

In an embodiment, the multimedia interaction method may further include: receiving a reply operation of the user for the subtitle interaction content; and displaying a reply editing interface, and obtaining a subtitle interaction reply content inputted by the user through the reply editing interface. In an example, the multimedia interaction method may further include: displaying the subtitle interaction reply content in association with the subtitle interaction content.

The reply operation refers to an operation for making a reply to existing subtitle interaction content. The operation may be in various forms, such as a hover operation over the subtitle interaction content and a clicking operation on a displayed reply button. The reply editing interface is an interface provided to the user to enable the user to edit and post a reply. After the subtitle interaction content is displayed in a subtitle window, the reply operation of the user for the subtitle interaction content may be received. The reply editing interface may be then displayed to the user, and a subtitle interaction reply content inputted by the user through the reply editing interface may be obtained. The subtitle interaction reply content may include a comment and/or a sticker. In an example, the subtitle interaction reply content may be displayed in association with the subtitle interaction content. That is, the subtitle interaction reply content may be displayed in the subtitle interaction window.

In an embodiment, referring to FIG. 2, the mouse arrow in the subtitle display window 13 may indicate that a current user 5 has selected the comment "I agree with this" from a user 4. A reply button may be displayed to the user on the right side of the target subtitle "1234". It may be determined to receive the reply operation for the target subtitle "1234", when a triggering operation of the current user 5 for the reply button is received. Then, the reply editing interface (not shown) may be displayed to the user 5, and the subtitle interaction reply content inputted by user 5 may be obtained. The subtitle "Please have a look" in FIG. 2 is the subtitle interaction reply content inputted by user 5. The subtitle interaction reply content may be displayed below the targeted comment "I agree with this" with a background color having a distinct gray-scale so as to hint the user.

In the above solution, after a subtitle interaction content is displayed, the user may further perform a reply interaction on the subtitle interaction content based on an actual demand. Content of the reply interaction is associated with the subtitle interaction content, which further satisfies interaction requirements of the user for the subtitle interaction content and improves user experience in interaction.

In an embodiment, the multimedia interaction method may further include: receiving, a search triggering operation of the user for a search keyword; and distinctively displaying a target keyword hit by searching for the search keyword in the subtitle content and the subtitle interaction content. The subtitle interaction content including the target keyword is displayed in a subtitle interaction window.

The search keyword may be a keyword currently inputted by the user to be searched for. The search triggering operation refers to a triggering operation for searching. A form of the operation is not specifically limited. For example, a preset search button may be triggered. The target keyword is the same as or similar to the search keyword. After the search triggering operation of the user for a search keyword is received, a search may be performed on the subtitle content and the subtitle interaction content. A word with a matching degree greater than a matching degree threshold is determined as the target keyword hit by the search, and the target keyword is distinctively displayed. A way of distinctively displaying the target keyword is not limited in the embodiments of the present disclosure. For example, the target keyword may be distinctively displaying by adding a highlight, bolding, and underlining. The way of distinctively displaying the target keyword in the subtitle content may be the same as or different from that in the subtitle interaction content. The subtitle interaction content is displayed in the subtitle interaction window, and the subtitle interaction window may be controlled to jump to a position where the target keyword is displayed.

In an example, the multimedia interaction method may further include: displaying a search hit prompt identifier at a position corresponding to a timestamp of the target keyword on a playback timeline of the multimedia. The search hit prompt identifier is provided to prompt the user that the subtitle and/or subtitle interaction content corresponding to a current position is hit in search. Form of the search hit prompt identifier is not specifically limited, and may be presented, for example, as a dot. After the target keyword is determined, a time point of the target keyword in the multimedia may be determined, and the search hit prompt identifier may be displayed on the playback timeline of the multimedia at a position corresponding to the timestamp where the target keyword is located.

Figure 4:
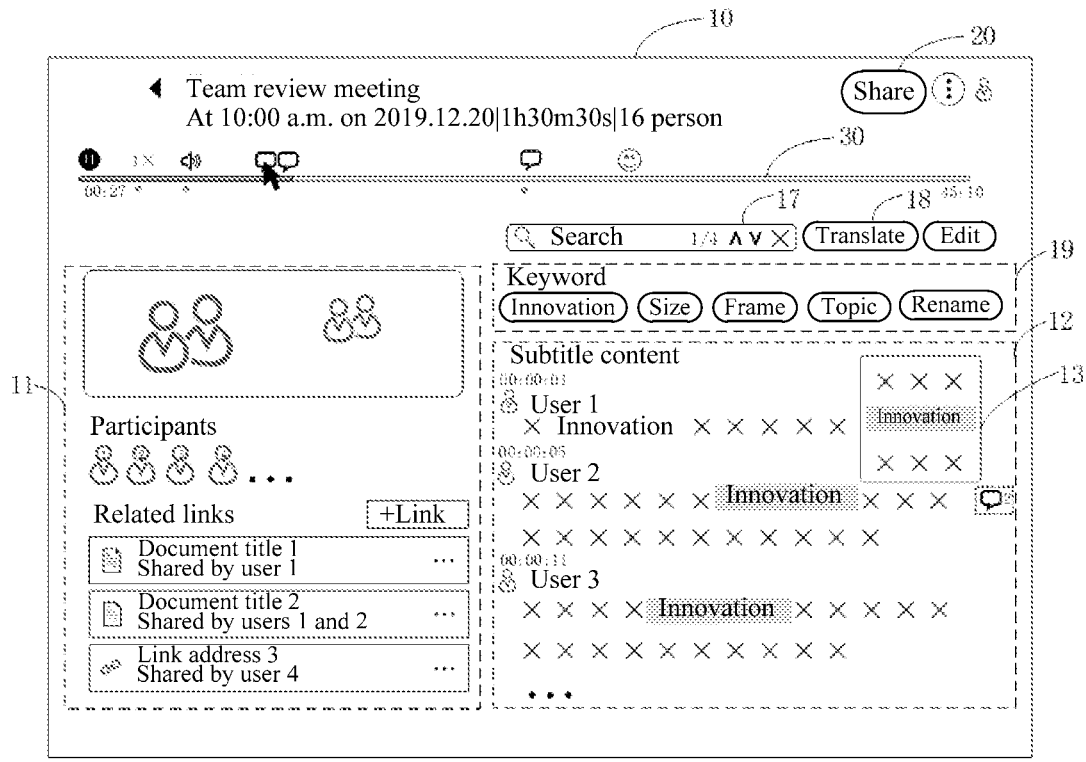
FIG. 4 is a schematic diagram of a multimedia display interface according to another embodiment of the present disclosure.

In an embodiment, FIG. 4 is a schematic diagram of a multimedia display interface according to an embodiment of the present disclosure. Referring to FIG. 4, a search area 17 is displayed in the multimedia display interface 10. A user may input a search keyword in the search area 17, and trigger a search button to perform a search operation for the search keyword. After the search is completed, a target keyword hit in the subtitle content and the subtitle interaction content are distinctively displayed. As shown in FIG. 4, the search keyword is "innovation", and the word "innovation" in the subtitle content and the subtitle interaction content in the subtitle interactive window 13 is displayed with a background color. The dots below the playback timeline 30 of the audio in an upper area of the multimedia display interface represent search hit prompt identifiers. Four search hit prompt identifiers for "innovation" is shown in FIG. 4. In FIG. 4, one subtitle content and a subtitle interaction content corresponding the subtitle content both include the word "innovation", and only one search hit prompt identifier is displayed on the playback timeline.

In the embodiments of the present disclosure, the subtitle content and the subtitle interaction content support a search function, and a keyword after search may be associated and interacted with the subtitle content, the subtitle interaction content, and the multimedia, so that the user may intuitively and quickly understand a correspondence of a search result in different contents, thereby improving user experience in searching.

In an example, the multimedia interaction method may further include: displaying, in a search display area, the total number of hits of the target keyword; and distinctively displaying a currently selected keyword in the target keyword and the search hit prompt identifier corresponding to the currently selected keyword, and displaying a sorting result of the currently selected keyword in the target keyword, where the currently selected keyword and the search hit prompt identifier are distinctively displayed in a different way from the target keyword. In an example, the multimedia interaction method may further include: receiving a jump operation of the user for the currently selected keyword, where the jump operation includes an upward jump and/or a downward jump; and displaying a currently selected keyword after jump.

In the embodiments of the present disclosure, after the search operation for a search keyword is performed, the total number of hits of the target keyword may be displayed in the search display area; a currently selected keyword and the search hit prompt identifier corresponding to the currently selected keyword are distinctively displayed, and a sorting result of the currently selected keyword in the target keyword is displayed. That is, a sequence number of the currently selected keyword among multiple target keywords is displayed. The currently selected keyword and the search hit prompt identifier are distinctively displayed in a different way from the target keyword, so as to distinguish the currently selected keyword from the other target keywords. In an example, a jump operation of the user for the currently selected keyword may be received. The jump operation is performed to jump to another target keyword. The jump operation may specifically include jumping up and/or jumping down. After the jump operation, another currently selected keyword after jump and a search hit prompt identifier corresponding to the another currently selected keyword are displayed in a second distinctive display manner.

In an embodiment, referring to FIG. 4, "¼" in the search area 17 indicates that the total count of hits of word "innovations" is 4, and the currently selected "innovation" is ranked first among the hits. The first "innovation" in the subtitle content is displayed in bold, and the corresponding search prompt identifier may be displayed as a square point. Two jump buttons, i.e., a jump up button and a jump down button, are displayed following the "¼" in the search area 17. When the user clicks the jump down button, a jumping down operation may be performed on the currently selected keyword, to jump to the second "innovation" in the subtitle content as shown in FIG. 4. Then, the "¼" in FIG. 4 is changed to "⅔", the second "innovation" is displayed in bold, and the search prompt identifier corresponding to the second "innovation" may be displayed as the square point. The first "innovation" and the search prompt identifier corresponding to the first "innovation" are recovered to be displayed in a first distinctive display manner.

In the above solution, after the user performs a search on the subtitle content and the subtitle interaction content, search results may be displayed, and the user may select from the search results. In this way, the user may understand a correspondence of different search results with different contents, based on different distinctive display manners after selection, which further improves the user experience in searching.

In an embodiment, the multimedia interaction method may further include: receiving a translation triggering operation of the user for the subtitle content of the multimedia and the subtitle interaction content; and translating the subtitle content of the multimedia and the subtitle interaction content from an initial language into a target language.

The translation triggering operation is a triggering operation for translating the subtitle content and the subtitle interaction content from a language into another language. After the translation triggering operation of the user for the subtitle content and the subtitle interaction content is received, the subtitle content and the subtitle interaction content may be translated from a current original language into a target language. The target language may be specified by the user, and may include various languages, which are not specifically limited.

In an embodiment, referring to FIG. 4, a translation button 18 is displayed in the multimedia display interface 10. When the user triggers the translation button 18, all texts in the multimedia display interface 10 may be translated, or the subtitle content or the subtitle interaction content may be selectively translated, from the original language to the target language. For example, the subtitle content and the subtitle interaction content may be translated from Chinese to English.

In the embodiments of the present disclosure, the subtitle content and the subtitle interaction content can support a translation function, which meets user requirements for translation between different languages, and is more beneficial for the user to understand the subtitle content and the subtitle interaction content.

In addition, referring to FIG. 4, a keyword display area 19, a share button 20, and the like may be provided in the multimedia display interface 10. When the user triggers a button, an operation corresponding to the button may be performed. Five keywords, i.e., "innovation", "size", "frame", "component" and "rename" are exemplarily shown in the keyword display area 19. Each of the keywords may be extracted from the subtitle content and the subtitle interaction content. When the user triggers one of the keywords, the keyword in the subtitle content and the subtitle interaction content may be distinctively displayed. For example, when "innovation" is triggered, each "innovation" in the subtitle content and the subtitle interaction content is distinctively displayed. The way of distinctively displaying is not specifically limited. When the user triggers the share button 20, the multimedia display interface 10 may be shared to other users as a whole. In addition, the playback timeline 30 of an audio may be displayed at a top or a bottom of the multimedia display interface 10, which may be set based on an actual condition and is not specifically limited herein.

It may be understood that the multimedia display interfaces in FIG. 2, FIG. 3, and FIG. 4 in the embodiments of the present disclosure are only examples, rather than limitations on the multimedia display interface. The multimedia display interface may be set for various situations based on actual conditions and user demands.

In the multimedia interaction method according to the embodiments of the present disclosure, multiple subtitle interaction contents for a subtitle content of a multimedia may be quickly presented based on a triggering for a subtitle interaction aggregation identifier, which improves an efficiency of displaying the subtitle interaction content. The subtitle interaction aggregation identifier, when not triggered, is displayed as only a single identifier. Compared with the conventional display method, the solution according to the embodiment of the present disclosure may be displayed according to a user choice, and therefore is more flexible and has a better display effect. In addition, multiple multimedia interaction contents for the multimedia may be quickly displayed based on the triggering of the subtitle interaction aggregation identifier. Both the subtitle interaction content and the multimedia interaction content may be displayed based on the triggering of the subtitle interaction aggregation identifier, which further improves display efficiency and display effect in the interaction content. The multimedia interaction content may be expanded from a hidden state and displayed in the subtitle interaction window based on a triggering operation on a subtitle interaction prompt identifier on a playback timeline of the multimedia, which further improves display effect in the subtitle interaction content and makes the display more flexible. An interactive card may be provided to display relevant subtitle interaction data and/or multimedia interaction data when the timeline is triggered by the user. In this way, the displayed interaction data is more comprehensive and has strong pertinence, realizing a better display effect for the interaction data. A split function and a deletion function are supported for subtitle segments in the subtitle content, and display of the subtitle interaction content changes with an actual operation of the user, which have a higher flexibility. After the subtitle interaction content is displayed, a user may reply to and interact with the subtitle interaction content based on an actual demand. A search operation and a translation operation are supported for the subtitle interaction content, allowing more diverse interactive functions and more conducive to meeting diverse demands of users.

Figure 5:
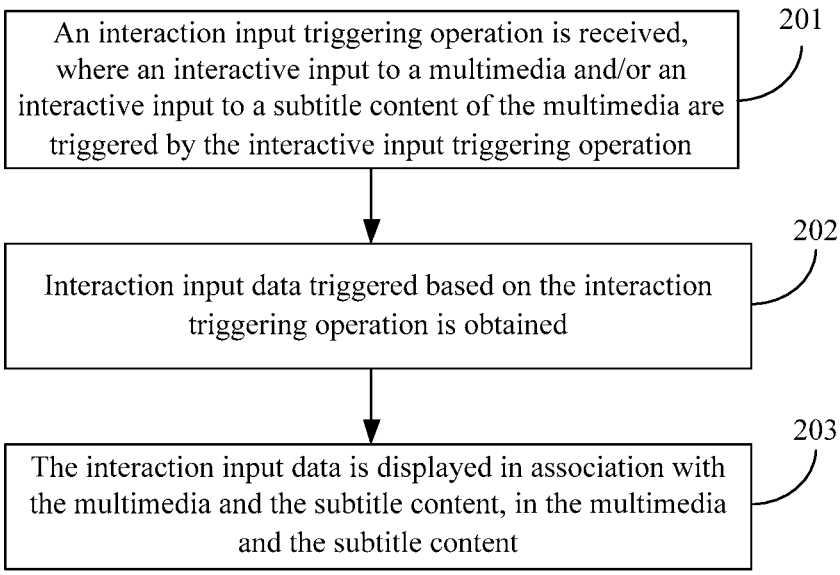
FIG. 5 is a schematic flowchart of a multimedia interaction method according to another embodiment of the present disclosure.

FIG. 5 is a schematic flowchart of a multimedia interaction method according to another embodiment of the present disclosure. The method may be performed by a multimedia interaction apparatus. The apparatus may be implemented by software and/or hardware, and may generally be integrated in an electronic device. As shown in FIG. 5, on the basis of the above embodiments, the method includes steps 201 to 203.

In step 201, an interaction input triggering operation is received, where an interactive input to a multimedia and/or an interactive input to a subtitle content of the multimedia are triggered by the interactive input triggering operation.

The interaction input triggering operation refers to a triggering operation which is performed, by a user, an interactive input on the multimedia and/or the subtitle content of the multimedia currently being viewed. Form of the interaction input triggering operation is not limited in the embodiments of the present disclosure, which may be a hover operation, a clicking operation, or the like.

The interaction input triggering operation of a user for the multimedia and/or the subtitle content of the multimedia may be received, when the user views the multimedia and/or the subtitle content of the multimedia.

In step 202, interaction input data triggered based on the interaction triggering operation is obtained.

The interaction input data may include a multimedia interaction content and/or a subtitle interaction content as described in the foregoing embodiments. The multimedia interaction content refers to an interaction content inputted to the multimedia, and the subtitle interaction content refers to an interaction content inputted to the subtitle content.

In an embodiment, after the interaction input triggering operation is received, an interaction input interface including an interactive component may be displayed to the user, and the multimedia interaction content and/or subtitle interaction content inputted by the user may be obtained based on the interactive component. There may be multiple interactive components, including a comment component and/or a sticker component.

In step 203, the interaction input data is displayed in association with the multimedia and the subtitle content, in the multimedia and the subtitle content.

In an embodiment of the present disclosure, the multimedia interaction content in the interaction input data may be displayed in association with the multimedia and the subtitle content, and the subtitle interaction content in the interaction input data may also be presented in association with the multimedia and the subtitle content.

In some application scenarios, the interaction input data may be associatively displayed based on a timestamp of the subtitle content and a timestamp of the multimedia. In an example, a unit (such as a word, sentence and/or paragraph) in the subtitle content may have a timestamp, which represents time information of a speech corresponding to the unit appearing in the multimedia. In this way, the interaction input data triggered for the multimedia may be presented at the subtitle content corresponding to a trigger moment (a playback progress of the multimedia indicated by the triggering operation), that is, displayed in association with the subtitle content. Besides, the interaction input data triggered for the subtitle content may also be presented in association with a multimedia segment corresponding to the timestamp of the triggered subtitle content.

The multimedia interaction content in the interaction input data is obtained, and then may be displayed in a pop-up window or may be associatively displayed on the multimedia timeline of the multimedia, and also may be associatively displayed in a subtitle interactive window within the area including the subtitle content. The subtitle interaction content in the interaction input data is obtained, and then may be displayed in a pop-up window or may be associatively displayed on the multimedia timeline of the multimedia, and also may be associatively displayed in a subtitle interactive window within the area including the subtitle content. Different types of interaction content in the interaction input data may be presented in the same window or interface, or may be presented in different windows or interfaces, which are not specifically limited.

In addition, different types of interaction content in the interaction input data may be presented in different ways (for example, using different identifiers), so as to distinguish one from another.

It may be understood that, after the interaction input data is obtained, there may be various manners to display the interaction input data in association with the multimedia and the subtitle content, which are described exemplarily above and are not described in detail herein. In addition, on the premise of no contradiction, the various steps and features in the embodiments of the present disclosure may be combined with other embodiments of the present disclosure (including but not limited to the embodiments shown in FIG. 1 and FIG. 6, and specific implementations thereof).

In the multimedia interaction method according to the embodiments of the present disclosure, an interaction input triggering operation is received, where an interactive input to a multimedia and/or an interactive input to a subtitle content of the multimedia is triggered by the interactive input triggering operation; interaction input data triggered based on the interaction triggering operation is obtained; and the interaction input data is displayed in the multimedia and the subtitle content in association with the multimedia and the subtitle content. With the above technical solution, both an obtained interaction content for the multimedia and an obtained interaction content for the subtitle content of the multimedia may be displayed in association with the multimedia and the subtitle content, realizing a cross-association display of the interactive data for the multimedia and the interactive data for the subtitle content, which improves the display effect, and facilitates user understanding of a correspondence among the multimedia, the subtitle and the interactive data, and makes interactive functions more relevant and more diverse. Thus, the user experience effect is improved.

Figure 6:
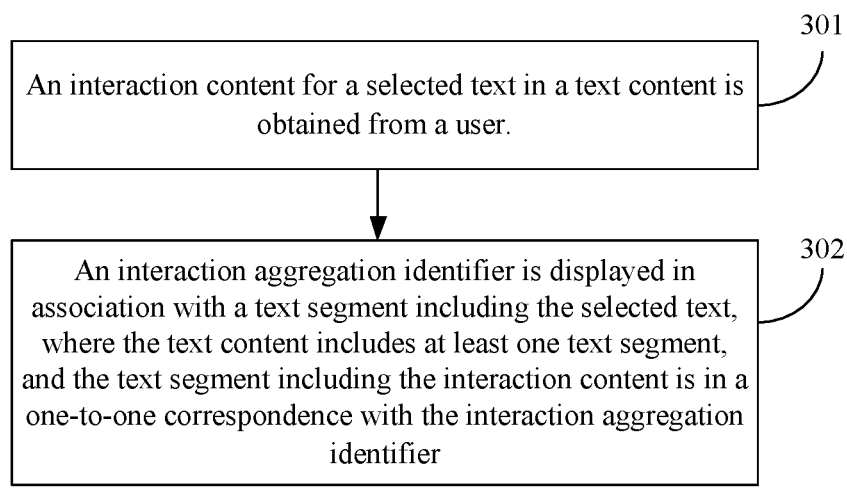
FIG. 6 is a schematic flowchart of an information interaction method according to another embodiment of the present disclosure.

FIG. 6 is a schematic flowchart of an information interaction method according to an embodiment of the present disclosure. The method may be performed by an information interaction apparatus, where the apparatus may be implemented by software and/or hardware, and may generally be integrated in an electronic device. As shown in FIG. 6, on the basis of the above-mentioned embodiments, the method includes steps 301 to 302.

In step 301, an interaction content for a selected text in a text content is obtained from a user.

The text content may be understood as any content composed of words, and a source of the text content is not specifically limited. In the above embodiments, the subtitle content obtained by performing speech recognition on the multimedia is an example of the text content. The selected text refers to a text, corresponding to a triggering operation of the user, in the text content. The interaction content is inputted by the user for the selected text, which may specifically include a comment and/or a sticker. The quantity and publisher of the interaction content are not limited in the embodiments of the present disclosure. When the text content is the subtitle content, the interaction content refers to a subtitle interaction content for the subtitle content.

When the user views the text content, an interaction input triggering operation of the user for the selected text in the text content may be received, and then an interaction input interface including an interactive component may be displayed to the user. An interaction content inputted by the user may be obtained based on the interactive component. The interaction content may include multiple types of content, and thus there are multiple interactive components, for example, including a comment component and/or a sticker component.

In step 302, an interaction aggregation identifier is displayed in association with a text segment including the selected text, where the text content includes at least one text segments, and the text segment including the interaction content is in a one-to-one correspondence with the interaction aggregation identifier.

The text segment is obtained, by splitting the text content, for example, based on semantics. The text content may include one or more text fragments, and each text segment may include a part of text content. The number of text fragments is not limited. The interaction aggregation identifier is a prompt identifier representing that the user has inputted an interaction content for the text content, and the prompt identifier is an aggregation identifier which may correspond to one or more interaction contents.

After the interaction content input by the user with respect to the selected text is obtained, the interaction aggregation identifier may be displayed in association with the text segment including the selected text. There may be one or more selected texts. In the case of one selected text, the selected text may be included in one text segment, or in at least two consecutive text segments, and interaction aggregation identifiers are displayed at the at least two consecutive segments respectively. In the case of two or more selected texts, the selected texts may be included in one text fragment, or in multiple different non-consecutive text segments. The subtitle segments including the selected texts are displayed with corresponding subtitle interaction aggregation identifiers. A position of the interaction aggregation identifier is not specifically limited, and may be set based on an actual situation.

In an example, since the number of interaction contents is one or more, the number of the interaction contents included in the text segment associated with the interactive aggregation identifier may be displayed in the corresponding interaction aggregation identifier.

In an example, after the interaction aggregation identifier is displayed, and when a triggering operation of the user for the interaction aggregation identifier is received, at least one interaction content included in the text segment associated with the interactive aggregation identifier may be displayed.

In addition, on the premise of no contradiction, various steps and features in the embodiments of the present disclosure may be combined with other embodiments of the present disclosure (including but not limited to the embodiments shown in FIG. 1 and FIG. 5, and the specific implementations thereof).

In the information interaction method according to the embodiments of the present disclosure, an interaction content for a selected text in a text content is obtained from a user, and an interaction aggregation identifier is displayed in association with a text segment including the selected text, where the text content includes at least one text segment, and the text segment including the interaction content is in a one-to-one correspondence with the interaction aggregation identifier. With the technical solution, after an interaction content for a selected text in a text content is obtained from a user, an interaction aggregation identifier may be displayed in association with a text segment including the selected text. Since the interaction aggregation identifier is an aggregated representation of one or more interaction contents, triggering of the interaction aggregation identifier can realize a quick displaying of multiple related interaction contents, which improves display efficiency for the interaction contents, and leads higher flexibility and a better display effect.

Figure 7:
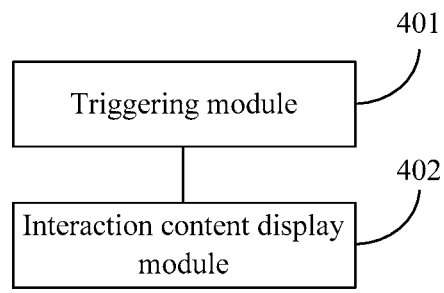
FIG. 7 is a schematic structural diagram of a multimedia interaction apparatus according to an embodiment of the present disclosure.

FIG. 7 is a schematic structural diagram of a multimedia interaction apparatus according to an embodiment of the present disclosure. The apparatus may be implemented by software and/or hardware, and may generally be integrated into an electronic device. As shown in FIG. 7, the apparatus includes a triggering module 401 and an interaction content display module 402.

The triggering module 401 is configured to receive a triggering operation of a user for a subtitle interaction aggregation identifier on a multimedia display interface, wherein the multimedia display interface displays a multimedia, a subtitle content of the multimedia, and the subtitle interaction aggregation identifier.

The interaction content display module 402 is configured to display at least one subtitle interaction content corresponding to the subtitle interaction aggregation identifier, where the subtitle interaction content indicates an interaction content for the subtitle content.

In an example, the apparatus further includes an identifier display module configured to: before the triggering operation of the user for the subtitle interaction aggregation identifier on a multimedia display interface is received, display the subtitle interaction aggregation identifier on the multimedia display interface, in response to that a subtitle interaction content input by the user for a target subtitle in the subtitle content is obtained.

In an example, the identifier display module is further configured to display, on the multimedia display interface, the subtitle interaction aggregation identifier in association with a subtitle segment including the target subtitle, where the subtitle segment including the subtitle interaction content is in a one-to-one correspondence with the subtitle interaction aggregation identifier.

In an example, the identifier display module is further configured to display, in the case where at least two consecutive subtitle segments include the same target subtitle, at least two subtitle interaction aggregation identifiers respectively at the at least two consecutive subtitle segments.

In an example, the subtitle interaction aggregation identifier includes the number of the subtitle interaction content for an associated subtitle segment, where the subtitle interaction content includes a comment and/or a sticker.

In an example, the interaction content display module 402 is further configured to display, in a subtitle interaction window on the multimedia display interface, at least one subtitle interaction content for the subtitle segment associated with the subtitle interaction aggregation identifier.

In an example, the apparatus further includes: a multimedia interaction content module configured to display at least one multimedia interaction content in a subtitle interaction window, wherein the multimedia interaction content corresponds to a time period corresponding to a subtitle segment associated with the subtitle interaction aggregation identifier, and the multimedia interaction content indicates an interaction content for the multimedia obtained based on a playback timeline of the multimedia.

In an example, the subtitle content includes at least two subtitle segments, and the subtitle segments are obtained by performing semantic split on the subtitle content.

In an example, the apparatus further includes a prompt triggering module, which is specifically configured to: receive a triggering operation of the user for a subtitle interaction prompt identifier on a playback timeline of the multimedia on the multimedia display interface; and display the subtitle interaction content corresponding to the subtitle interaction prompt identifier in a subtitle interaction window.

In an example, one subtitle interaction prompt identifier corresponds to at least one subtitle interaction content for an associated subtitle, where the associated subtitle indicates a subtitle at an associated time point corresponding to the subtitle interaction prompt identifier or a subtitle in an associated time period corresponding to the subtitle interaction prompt identifier.

In an example, the subtitle interaction window is displayed in association with the subtitle interaction aggregation identifier.

In an example, the apparatus further includes: a playback module configured to, after the triggering operation of the user for the subtitle interaction prompt identifier on a playback timeline of the multimedia on the multimedia display interface is received, play the multimedia based on a timestamp of an associated subtitle corresponding to the subtitle interaction prompt identifier.

In an example, the apparatus further includes: a distinctive display module configured to: after the triggering operation of the user for the subtitle interaction prompt identifier on the playback timeline of the multimedia on the multimedia display interface is received, control the subtitle content of the multimedia to jump to a position of an associated subtitle corresponding to the subtitle interaction prompt identifier, and distinctively display the associated subtitle and the subtitle interaction content for the associated subtitle.

In an example, the apparatus further includes: a subtitle interaction data display module configured to receive an interaction display triggering operation of the user for a position corresponding to a target time point on the playback timeline of the multimedia; and display an interactive card, where the interactive card includes subtitle interaction data of a subtitle corresponding to the target time point, and the subtitle interaction data includes the subtitle interaction content and/or statistical data of the subtitle interaction content.

In an example, the interactive card further includes multimedia interaction data for the multimedia at the target time point, and the multimedia interaction data includes a multimedia interaction content and/or statistical data of the multimedia interaction content.

In an example, the apparatus further includes: a subtitle deletion module configured to receive a deletion operation of the user for a first subtitle segment in the subtitle content; and display, after the first subtitle segment is deleted, the subtitle interaction aggregation identifier corresponding to the first subtitle segment in an area associated with a historical position of the first subtitle segment.

In an example, the apparatus further includes: a subtitle splitting module configured to receive a splitting operation of the user for a second subtitle segment in the subtitle content, where the second subtitle segment is split into at least two subtitle sub-segments in the splitting operation; and split, based on the split subtitle sub-segments, the subtitle interaction content of the second subtitle segment.

In an example, the subtitle splitting module is further configured to delete a historical subtitle interaction aggregation identifier of the second subtitle segment, and display a new subtitle interaction aggregation identifier in association with the subtitle sub-segment including the subtitle interaction content.

In an example, the apparatus further includes: an interaction display module configured to receive a triggering operation of the user for a selected subtitle in the subtitle content; and display, in a subtitle interaction window on the multimedia display interface, the subtitle interaction content for the selected subtitle or the subtitle interaction content of the subtitle segment including the selected subtitle.

In an example, the apparatus further includes: a subtitle interaction reply module configured to receive a reply operation of the user for the subtitle interaction content; and display a reply editing interface and obtain a subtitle interaction reply content inputted by the user through the reply editing interface.

In an example, the subtitle interaction reply module is further configured to display the subtitle interaction reply content in association with the subtitle interaction content.

In an example, the apparatus further includes: a search module configured to receive a search triggering operation of the user for the search keyword; and distinctively display a target keyword hit by searching for the search keyword in the subtitle content and the subtitle interaction content.

In an example, the subtitle interaction content including the target keyword is displayed in a subtitle interaction window.

In an example, the search module is further configured to display a search hit prompt identifier at a position corresponding to a timestamp of the target keyword on a playback timeline of the multimedia.

In an example, the apparatus further includes: a search result display module configured to display the total number of hits of the target keyword in a search display area; and distinctively display a currently selected keyword in the target keyword and the search hit prompt identifier corresponding to the currently selected keyword, and display a sorting result of the currently selected keyword in the target keyword, where the currently selected keyword and the search hit prompt identifier are distinctively displayed in a different way from the target keyword.

In an example, the search result display module is further configured to receive a jump operation of the user for the currently selected keyword, where the jump operation includes an upward jump and/or a downward jump; and display a currently selected keyword after jump.

In an example, the apparatus further includes: a translation module configured to receive a translation triggering operation of the user for the subtitle content of the multimedia and the subtitle interaction content; and translate the subtitle content of the multimedia and the subtitle interaction content from an original language into a target language.

In an example, the multimedia and the subtitle content are displayed in different areas of the multimedia display interface.

The multimedia interaction apparatus according to the embodiments of the present disclosure can perform the multimedia interaction method according to any one of the embodiments of the present disclosure, which includes functional modules and beneficial effects corresponding to the method.

Figure 8:
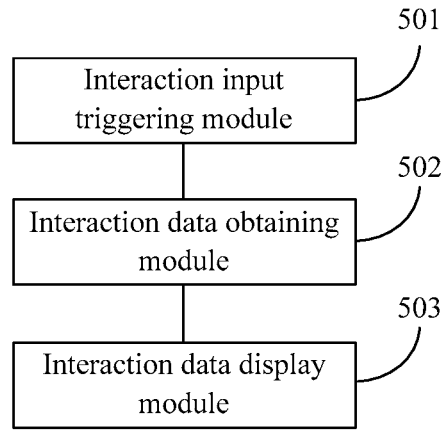
FIG. 8 is a schematic structural diagram of a multimedia interaction apparatus according to another embodiment of the present disclosure.

FIG. 8 is a schematic structural diagram of a multimedia interaction apparatus according to another embodiment of the present disclosure. The apparatus may be implemented by software and/or hardware, and may generally be integrated into an electronic device. As shown in FIG. 8, the apparatus includes an interaction input triggering module 501, an interaction data obtaining module 502, and an interaction data display module 503.

The interaction input triggering module 501 is configured to receive an interaction input triggering operation, where an interactive input to a multimedia and/or an interactive input to a subtitle content of the multimedia are triggered by the interactive input triggering operation.

The interaction data obtaining module 502 is configured to obtain interaction input data triggered based on the interaction triggering operation.

The interaction data display module 503 is configured to display, in the multimedia and the subtitle content, the interaction input data in association with the multimedia and the subtitle content.

The multimedia interaction apparatus according to the embodiments of the present disclosure can perform the multimedia interaction method according to any one of the embodiments of the present disclosure, which has functional modules and beneficial effects corresponding to the method.

Figure 9:
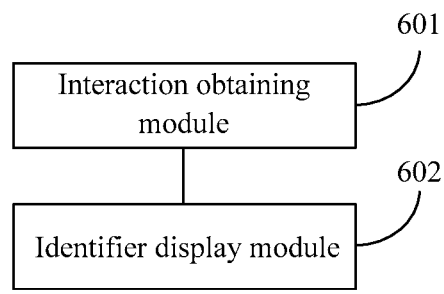
FIG. 9 is a schematic structural diagram of an information interaction apparatus according to an embodiment of the present disclosure.

FIG. 9 is a schematic structural diagram of an information interaction apparatus according to an embodiment of the present disclosure. The apparatus may be implemented by software and/or hardware, and may generally be integrated in an electronic device. As shown in FIG. 9, the apparatus includes an interaction obtaining module 601 and an identifier display module 602.

The interaction obtaining module 601 is configured to obtain an interaction content for a selected text in a text content from a user.

The identifier display module 602 is configured to display the interaction aggregation identifier in association with a text segment including the selected text, wherein the text content includes at least one text segment, and the text segment including the interaction content is in a one-to-one correspondence with the interaction aggregation identifier.

The information interaction apparatus according to in the embodiments of the present disclosure can execute the information interaction method according to any one of the embodiments of the present disclosure, which has corresponding functional modules and beneficial effects corresponding to the method.

Figure 10:
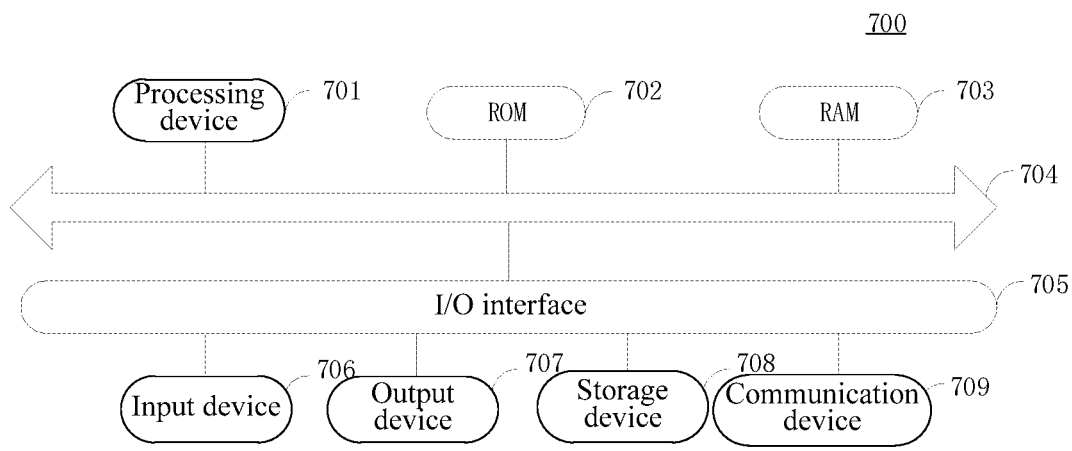
FIG. 10 is a schematic structural diagram of an electronic device according to an embodiment of the present disclosure.

FIG. 10 is a schematic structural diagram of an electronic device according to an embodiment of the present disclosure. Referring to FIG. 10, a schematic structural diagram of an electronic device 700 suitable for implementing the embodiments of the present disclosure is shown. The electronic device 700 according to an embodiment of the present disclosure may include, but is not limited to, a mobile terminal such as a mobile phone, a laptop, a digital broadcast receiver, a PDA (personal digital assistant), a PAD (tablet), a PMP (portable multimedia player), a vehicle-mounted terminal (such as an in-vehicle navigation terminal), and a fixed terminal such as a digital TV, a desktop computer. The electronic device shown in FIG. 10 is only exemplary, and should not indicate any limitation to the function and application scope of the embodiments of the present disclosure.

As shown in FIG. 10, the electronic device 700 may include a processing device 701 (such as a central processing unit or a graphics processor), which may perform various operations and processing based on a program stored in a read only memory (ROM) 702 or a program loaded from a storage device 708 into a random access memory (RAM) 703. The RAM 703 is further configured to store various programs and data required for an operation of the electronic device 700. The processing device 701, the ROM 702 and the RAM 703 are connected to each other via a bus 704. An Input/Output (I/O) interface 705 is also connected to the bus 704.

Generally, the I/O interface 705 may be connected to: an input device 706 such as a touch screen, a touch panel, a keyboard, a mouse, a camera, a microphone, an accelerometer, and a gyroscope; an output device 707 such as a liquid crystal display (LCD), a speaker, and a vibrator; a storage device 708 such as a magnetic tape and a hard disk; and a communication device 709. The communication device 709 enables wireless or wired communication between the electronic device 700 and other devices for data exchanging. Although FIG. 10 shows an electronic device 700 having various components, it should be understood that the illustrated components are not necessarily required to all be implemented or embodied. More or fewer devices may be implemented or included as an alternation.

According to the embodiments of the present disclosure, the process described above in conjunction with flowcharts may be implemented as a computer program. For example, a computer program product is further provided as an embodiment in the present disclosure, including a computer program carried on a non-transient computer readable medium. The computer program includes program code for performing a method shown in the flowcharts. In the embodiment, the computer program may be downloaded and installed from a network via the communication device 709, or installed from the storage 708, or installed from the ROM 702. When the computer program is executed by the processing device 701, the above functions defined in the multimedia interaction method or the information interaction method according to the embodiments of the present disclosure are performed.

It is to be noted that, the computer readable medium mentioned in the present disclosure may be a computer readable signal medium or a computer readable storage medium or any combination thereof. The computer readable storage medium may be, but is not limited to, a system, apparatus, or device in an electronic, magnetic, optical, electromagnetic, infrared, or semi-conductive form, or any combination thereof. More specifically, the computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device or any combination thereof. In the embodiments of the present disclosure, the computer readable storage medium may be any tangible medium containing or storing a program, and the program may be used by or in combination with an instruction execution system, apparatus, or device. In the embodiments of the present disclosure, the computer readable signal medium may be a data signal carrying computer readable program code transmitted in a baseband or transmitted as a part of a carrier wave. The transmitted data signal may be in various forms, including but not limited to an electromagnetic signal, an optical signal or any proper combination thereof. The computer-readable signal medium may be any computer-readable medium other than the computer-readable storage medium. The computer-readable signal medium may send, propagate or transmit a program for use by or use in combination with an instruction execution system, apparatus or device. The program code stored in the computer readable medium may be transmitted via any proper medium, including but not limited to a wire, an optical cable, radio frequency and the like, or any proper combination thereof.

In some embodiments, a client device and a server may communicate in any network protocol currently known or future developed, such as HTTP (Hyper Text Transfer Protocol), and may be interconnected with digital data communication in any form or medium (such as a communication network). Examples of a communication network include a local area network ("LAN"), a wide area networks ("WAN"), an internet (such as the Internet), and a peer-to-peer network (such as an ad hoc peer-to-peer network), and any network currently known or future developed.

The computer readable medium may be incorporated in the electronic device, or may exist alone without being assembled into the electronic device.

The computer-readable medium carries one or more programs, which, when executed by the electronic device, cause the electronic device to: receive a triggering operation of a user for a subtitle interaction aggregation identifier on a multimedia display interface, where the multimedia display interface displays a multimedia, a subtitle content of the multimedia, and the subtitle interaction aggregation identifier; and display at least one subtitle interaction content corresponding to the subtitle interaction aggregation identifier, where the subtitle interaction content indicates an interaction content for the subtitle content.

Alternatively, the computer-readable medium carries one or more programs, which, when executed by the electronic device, cause the electronic device to: receive an interaction input triggering operation, where an interactive input to a multimedia and/or an interactive input to a subtitle content of the multimedia is triggered by the interactive input triggering operation; obtain interaction input data triggered based on the interaction triggering operation; and display, in the multimedia and the subtitle content, the interaction input data in association with the multimedia and the subtitle content.

Alternatively, the computer-readable medium carries one or more programs, which, when executed by the electronic device, cause the electronic device to: obtain an interaction content for a selected text in a text content from a user; and display an interaction aggregation identifier in association with a text segment including the selected text, where the text content includes at least one text segment, and the text segment including the interaction content is in a one-to-one correspondence with the interaction aggregation identifier.

The computer program code for performing the operations disclosed in the embodiments of the present disclosure may be written in one or more programming languages or combinations thereof. The programming languages include, but are not limited to, an object-oriented programming language such as Java™, Smalltalk™, and C++, and a conventional procedural programming language such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer via any kind of network including a local area network (LAN) or a wide area network (WAN), or may be connected to an external computer by using an Internet connection provided by an Internet service provider, for example.

The flowcharts and block diagrams in the drawings illustrate possible architecture, functions and operations implemented by the system, method and computer program product according to the embodiments of the present disclosure. In this regard, each block in a flowchart or a block diagram may represent a module, a program segment, or a part of code, and the module, the program segment, or the part of code includes one or more executable instructions for implementing specified logical functions. It should be noted that, in some alternative implementations, the functions marked in the blocks may be performed in an order different from the order shown in the drawings. For example, two blocks shown in succession may actually be executed in parallel, or sometimes may be executed in a reverse order, which depends on the functions involved. Besides, each box in a block diagram or a flowchart, and a combination of boxes in the block diagram or the flowchart, may be implemented by using a dedicated hardware-based system configured to perform a specified function or operation, or may be implemented by using a combination of dedicated hardware and a computer instruction.

The units mentioned in the embodiments of the present disclosure may be implemented by means of software, or otherwise by means of hardware. In some circumstances, a name of a unit does not constitute a limitation on the unit itself.

The functions described herein above may be performed, at least in part, by one or more hardware logic components. For example, exemplary types of hardware logic components that may be used include but are not limited to: a Field Programmable Gate Array (FPGA), an Application Specific Integrated Circuit (ASIC), an Application Specific Standard Product (ASSP), a Systems on Chip (SOC), a Complex Programmable Logical Device (CPLD), and the like.

In the context of the present disclosure, the machine-readable medium may be a tangible medium, and may contain or store a program for use by or in combination with an instruction execution system, apparatus or device. The machine-readable medium may be a machine-readable signal medium or a machine-readable storage medium. The machine-readable media may include, but is not limited to, a system, apparatus, or device in an electronic, magnetic, optical, electromagnetic, infrared, or semiconductor form, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage, a magnetic storage, or any suitable combination thereof.

According to one or more embodiments of the present disclosure, a multimedia interaction method is provided. The method includes:

receiving a triggering operation of a user for a subtitle interaction aggregation identifier on a multimedia display interface, wherein the multimedia display interface displays a multimedia, a subtitle content for the multimedia, and the subtitle interaction aggregation identifier; and displaying at least one subtitle interaction content corresponding to the subtitle interaction aggregation identifier, wherein the subtitle interaction content indicates an interaction content for the subtitle content.

In the multimedia interaction method according to one or more embodiments of the present disclosure, before the receiving a triggering operation of a user for a subtitle interaction aggregation identifier on a multimedia display interface, the method further includes:

in response to that a subtitle interaction content input by the user for a target subtitle in the subtitle content is obtained, displaying, on the multimedia display interface, the subtitle interaction aggregation identifier corresponding to the subtitle interaction content.

In the multimedia interaction method according to one or more embodiments of the present disclosure, the displaying, on the multimedia display interface, the subtitle interaction aggregation identifier corresponding to the subtitle interaction content includes:

displaying, on the multimedia display interface, the subtitle interaction aggregation identifier in association with a subtitle segment including the target subtitle, wherein the subtitle segment including the subtitle interaction content is in a one-to-one correspondence with the subtitle interaction aggregation identifier.

In the multimedia interaction method according to one or more embodiments of the present disclosure, the method further includes:
displaying, in a case where at least two consecutive subtitle segments include a same target subtitle, at least two subtitle interaction aggregation identifiers respectively at the at least two consecutive subtitle segments.

In the multimedia interaction method according to one or more embodiments of the present disclosure, the subtitle interaction aggregation identifier includes the number of the subtitle interaction content for an associated subtitle segment, wherein the subtitle interaction content includes a comment and/or a sticker.

In the multimedia interaction method according to one or more embodiments of the present disclosure, the displaying at least one subtitle interaction content corresponding to the subtitle interaction aggregation identifier includes:
displaying, in a subtitle interaction window on the multimedia display interface, at least one subtitle interaction content for the subtitle segment associated with the subtitle interaction aggregation identifier.

In the multimedia interaction method according to one or more embodiments of the present disclosure, the method further includes:
displaying at least one multimedia interaction content in a subtitle interaction window, wherein the multimedia interaction content corresponds to a time period corresponding to a subtitle segment associated with the subtitle interaction aggregation identifier, and the multimedia interaction content indicates an interaction content for the multimedia obtained based on a playback timeline of the multimedia.

In the multimedia interaction method according to one or more embodiments of the present disclosure, the subtitle content includes at least two subtitle segments, and the subtitle segments are obtained by performing semantic split on the subtitle content.

In the multimedia interaction method according to one or more embodiments of the present disclosure, the method further includes:
receiving a triggering operation of the user for a subtitle interaction prompt identifier on a playback timeline of the multimedia on the multimedia display interface; and
displaying, in a subtitle interaction window, the subtitle interaction content corresponding to the subtitle interaction prompt identifier.

In the multimedia interaction method according to one or more embodiments of the present disclosure, one subtitle interaction prompt identifier corresponds to at least one subtitle interaction content for an associated subtitle, where the associated subtitle is a subtitle at an associated time point corresponding to the subtitle interaction prompt identifier or a subtitle in an associated time period corresponding to the subtitle interaction prompt identifier.

In the multimedia interaction method according to one or more embodiments of the present disclosure, the subtitle interaction window is displayed in association with the subtitle interaction aggregation identifier.

In the multimedia interaction method according to one or more embodiments of the present disclosure, after the receiving a triggering operation of the user for a subtitle interaction prompt identifier on a playback timeline of the multimedia on the multimedia display interface, the method further includes:
playing the multimedia, based on a timestamp of an associated subtitle corresponding to the subtitle interaction prompt identifier.

In the multimedia interaction method according to one or more embodiments of the present disclosure, after the receiving a triggering operation of the user on a subtitle interaction prompt identifier on a playback timeline of the multimedia on the multimedia display interface, the method further includes:
controlling the subtitle content of the multimedia to jump to a position of the associated subtitle corresponding to the subtitle interaction prompt identifier, and distinctively displaying the associated subtitle and the subtitle interaction content for the associated subtitle.

In the multimedia interaction method according to one or more embodiments of the present disclosure, the method further includes:
receiving an interaction display triggering operation of the user for a position corresponding to a target time point on a playback timeline of the multimedia; and
displaying an interactive card, wherein the interactive card includes subtitle interaction data of a subtitle corresponding to the target time point, and the subtitle interaction data includes the subtitle interaction content and/or statistical data of the subtitle interaction content.

In the multimedia interaction method according to one or more embodiments of the present disclosure, the interactive card further includes multimedia interaction data for the multimedia at the target time point, and the multimedia interaction data includes a multimedia interaction content and/or statistical data of the multimedia interaction content.

In the multimedia interaction method according to one or more embodiments of the present disclosure, the method further includes:
receiving a deletion operation of the user for a first subtitle segment in the subtitle content; and
displaying, after the first subtitle segment is deleted, the subtitle interaction aggregation identifier corresponding to the first subtitle segment within an area associated with a historical position of the first subtitle segment.

In the multimedia interaction method according to one or more embodiments of the present disclosure, the method further includes:
receiving a splitting operation of the user for a second subtitle segment in the subtitle content, wherein the second subtitle segment is split into at least two subtitle sub-segments in the splitting operation; and
splitting, based on split subtitle sub-segments, the subtitle interaction content of the second subtitle segment.

In the multimedia interaction method according to one or more embodiments of the present disclosure, the method further includes:
deleting a historical subtitle interaction aggregation identifier of the second subtitle segment, and displaying a new subtitle interaction aggregation identifier in association with the subtitle sub-segment including the subtitle interaction content.

In the multimedia interaction method according to one or more embodiments of the present disclosure, the method further includes:
receiving a triggering operation of the user for a selected subtitle in the subtitle content, and
displaying, in a subtitle interaction window on the multimedia display interface, the subtitle interaction content for the selected subtitle or the subtitle interaction content for the subtitle segment including the selected subtitle, wherein the selected subtitle is a subtitle with the subtitle interaction content.

In the multimedia interaction method according to one or more embodiments of the present disclosure, the method further includes:
  receiving a reply operation of the user for the subtitle interaction content; and
  displaying a reply editing interface, and obtaining a subtitle interaction reply content inputted by the user through the reply editing interface.

In the multimedia interaction method according to one or more embodiments of the present disclosure, the method further includes:
  displaying the subtitle interaction reply content in association with the subtitle interaction content.

In the multimedia interaction method according to one or more embodiments of the present disclosure, the method further includes:
  receiving a search triggering operation of the user for a search keyword; and
  distinctively displaying a target keyword hit by searching for the search keyword in the subtitle content and the subtitle interaction content.

In the multimedia interaction method according to one or more embodiments of the present disclosure, the subtitle interaction content including the target keyword is displayed in a subtitle interaction window.

In the multimedia interaction method according to one or more embodiments of the present disclosure, the method further includes:
  displaying a search hit prompt identifier at a position corresponding to a timestamp of the target keyword on a playback timeline of the multimedia.

In the multimedia interaction method according to one or more embodiments of the present disclosure, the method further includes:
  displaying, in a search display area, the total number of hits of the target keyword; and
  distinctively displaying a currently selected keyword in the target keyword and the search hit prompt identifier corresponding to the currently selected keyword, and displaying a sorting result of the currently selected keyword in the target keyword, wherein the currently selected keyword and the search hit prompt identifier are distinctively displayed in a different way from the target keyword.

In the multimedia interaction method according to one or more embodiments of the present disclosure, the method further includes:
  receiving a jump operation of the user for the currently selected keyword, wherein the jump operation includes an upward jump and/or a downward jump; and
  displaying a currently selected keyword after jump.

In the multimedia interaction method according to one or more embodiments of the present disclosure, the method further includes:
  receiving a translation triggering operation of the user for the subtitle content of the multimedia and the subtitle interaction content; and
  translating the subtitle content of the multimedia and the subtitle interaction content from an original language into a target language.

In the multimedia interaction method according to one or more embodiments of the present disclosure, the multimedia and the subtitle content are displayed in different areas of the multimedia display interface.

A multimedia interaction method is provided according to one or more embodiments of the present disclosure. The method includes:
  receiving an interaction input triggering operation, wherein an interactive input to a multimedia and/or an interactive input to a subtitle content of the multimedia is triggered by the interactive input triggering operation;
  obtaining interaction input data triggered based on the interaction triggering operation; and
  displaying, in the multimedia and the subtitle content, the interaction input data in association with the multimedia and the subtitle content.

An information interaction method is provided according to one or more embodiments of the present disclosure. The method includes:
  obtaining an interaction content for a selected text in a text content from a user; and
  displaying an interaction aggregation identifier in association with a text segment including the selected text, wherein the text content includes at least one text segment, and the text segment including the interaction content is in a one-to-one correspondence with the interaction aggregation identifier.

A multimedia interaction apparatus is provided according to one or more embodiments of the present disclosure. The apparatus includes:
  a triggering module configured to receive a triggering operation of a user for a subtitle interaction aggregation identifier on a multimedia display interface, wherein the multimedia display interface displays a multimedia, a subtitle content of the multimedia, and the subtitle interactive aggregation identifier; and
  an interaction content display module configured to display at least one subtitle interaction content corresponding to the subtitle interaction aggregation identifier, wherein the subtitle interaction content indicates an interaction content for the subtitle content.

In the multimedia interaction apparatus according to one or more embodiments of the present disclosure, the apparatus further includes an identifier display module configured to: before the triggering operation of the user for the subtitle interaction aggregation identifier on a multimedia display interface is received, display the subtitle interaction aggregation identifier on the multimedia interface in response to that a subtitle interaction content input by the user for a target subtitle in the subtitle content is obtained.

In the multimedia interaction apparatus according to one or more embodiments of the present disclosure, the identifier display module is further configured to display, on the multimedia display interface, the subtitle interaction aggregation identifier in association with a subtitle segment including the target subtitle, wherein a subtitle segment including the subtitle interaction content is in a one-to-one correspondence with the subtitle interaction aggregation identifier.

In the multimedia interaction apparatus according to one or more embodiments of the present disclosure, the identifier display module is further configured to display, in a case where at least two consecutive subtitle segments include a same target subtitle, at least two subtitle interaction aggregation identifiers respectively at the at least two consecutive subtitle segments.

In the multimedia interaction apparatus according to one or more embodiments of the present disclosure, the subtitle interaction aggregation identifier includes the number of the subtitle interaction content for an associated subtitle segment, wherein the subtitle interaction content includes a comment and/or a sticker.

In the multimedia interaction apparatus according to one or more embodiments of the present disclosure, the interaction content display module is configured to: display, in a subtitle interaction window on the multimedia display interface, at least one subtitle interaction content for the subtitle segment associated with the subtitle interaction aggregation identifier.

In the multimedia interaction apparatus according to one or more embodiments of the present disclosure, the apparatus further includes a multimedia interaction content module configured to: display at least one multimedia interaction content in a subtitle interaction window, wherein the multimedia interaction content corresponds to a time period corresponding to a subtitle segment associated with the subtitle interaction aggregation identifier, and the multimedia interaction content indicates an interaction content for the multimedia obtained based on a playback timeline of the multimedia.

In the multimedia interaction apparatus according to one or more embodiments of the present disclosure, the subtitle content includes at least two subtitle segments, and the subtitle segments are obtained by performing semantic split on the subtitle content.

In the multimedia interaction apparatus according to one or more embodiments of the present disclosure, the apparatus further includes a prompt triggering module configured to receive a triggering operation of the user for a subtitle interaction prompt identifier on a playback timeline of the multimedia on the multimedia display interface; and display, in a subtitle interaction window, the subtitle interaction content corresponding to the subtitle interaction prompt identifier.

In the multimedia interaction apparatus according to one or more embodiments of the present disclosure, one subtitle interaction prompt identifier corresponds to at least one subtitle interaction content for an associated subtitle, wherein the associated subtitle is a subtitle at an associated time point corresponding to the subtitle interaction prompt identifier or a subtitle in an associated time period corresponding to the subtitle interaction prompt identifier.

In the multimedia interaction apparatus according to one or more embodiments of the present disclosure, the subtitle interaction window is displayed in association with the subtitle interaction aggregation identifier.

In the multimedia interaction apparatus according to one or more embodiments of the present disclosure, the apparatus further includes: a playback module configured to after the triggering operation of the user for the subtitle interaction prompt identifier on a playback timeline of the multimedia on the multimedia display interface is received, play the multimedia, based on a timestamp of an associated subtitle corresponding to the subtitle interaction prompt identifier.

In the multimedia interaction apparatus according to one or more embodiments of the present disclosure, the apparatus further includes: a highlighting module configured to after the triggering operation of the user for the subtitle interaction prompt identifier on a playback timeline of the multimedia on the multimedia display interface is received, control the subtitle content of the multimedia to jump to a position of the associated subtitle corresponding to the subtitle interaction prompt identifier, and distinctively display the associated subtitle and the subtitle interaction content for the associated subtitle.

In the multimedia interaction apparatus according to one or more embodiments of the present disclosure, the apparatus further includes: a subtitle interaction data display module configured to receive an interaction display triggering operation of the user for a position corresponding to a target time point on a playback timeline of the multimedia; and display an interactive card, wherein the interactive card includes subtitle interaction data of a subtitle corresponding to the target time point, and the subtitle interaction data includes the subtitle interaction content and/or statistical data of the subtitle interaction content.

In the multimedia interaction apparatus according to one or more embodiments of the present disclosure, the interactive card further includes multimedia interaction data for the multimedia at the target time point, and the multimedia interaction data includes a multimedia interaction content and/or statistical data of the multimedia interaction content.

In the multimedia interaction apparatus according to one or more embodiments of the present disclosure, the apparatus further includes: a subtitle deletion module configured to receive a deletion operation of the user for a first subtitle segment in the subtitle content; and display, after the first subtitle segment is deleted, the subtitle interaction aggregation identifier corresponding to the first subtitle segment within an area associated with a historical position of the first subtitle segment.

In the multimedia interaction apparatus according to one or more embodiments of the present disclosure, the apparatus further includes: a subtitle split module configured to receive a splitting operation of the user for a second subtitle segment in the subtitle content, wherein the second subtitle segment is split into at least two subtitle sub-segments in the splitting operation; and split, based on the split subtitle sub-segments, the subtitle interaction content of the second subtitle segment.

In the multimedia interaction apparatus according to one or more embodiments of the present disclosure, the subtitle split module is configured to delete a historical subtitle interaction aggregation identifier of the second subtitle segment, and display a new subtitle interaction aggregation identifier in association with the subtitle sub-segment including the subtitle interaction content.

In the multimedia interaction apparatus according to one or more embodiments of the present disclosure, the apparatus further includes: an interaction display module configured to receive a triggering operation of the user for a selected subtitle in the subtitle content, and display, in a subtitle interaction window on the multimedia display interface, the subtitle interaction content for the selected subtitle or the subtitle interaction content for the subtitle segment including the selected subtitle.

In the multimedia interaction apparatus according to one or more embodiments of the present disclosure, the apparatus further includes: a subtitle interaction reply module configured to receive a reply operation of the user for the subtitle interaction content; and display a reply editing interface and obtain a subtitle interaction reply content inputted by the user through the reply editing interface.

In the multimedia interaction apparatus according to one or more embodiments of the present disclosure, the subtitle interaction reply module is configured to display the subtitle interaction reply content in association with the subtitle interaction content.

In the multimedia interaction apparatus according to one or more embodiments of the present disclosure, the apparatus further includes: a search module configured to receive a search triggering operation of the user for a search keyword; and distinctively display a target keyword hit by searching for the search keyword in the subtitle content and the subtitle interaction content.

In the multimedia interaction apparatus according to one or more embodiments of the present disclosure, the subtitle interaction content including the target keyword is displayed in a subtitle interaction window.

In the multimedia interaction apparatus according to one or more embodiments of the present disclosure, the search module is configured to display a search hit prompt identifier at a position corresponding to a timestamp of the target keyword on a playback timeline of the multimedia.

In the multimedia interaction apparatus according to one or more embodiments of the present disclosure, the apparatus further includes: a search result display module configured to display, in a search display area, a total number of hits of the target keyword; and distinctively display a currently selected keyword in the target keyword and the search hit prompt identifier corresponding to the currently selected keyword, and display a sorting result of the currently selected keyword in the target keyword, wherein the currently selected keyword and the search hit prompt identifier are distinctively displayed in a different way from the target keyword.

In the multimedia interaction apparatus according to one or more embodiments of the present disclosure, the search result display module is further configured to receive a jump operation of the user for the currently selected keyword, wherein the jump operation includes an upward jump and/or a downward jump; and display a currently selected keyword after jump.

In the multimedia interaction apparatus according to one or more embodiments of the present disclosure, the apparatus further includes: a translation module configured to receive a translation triggering operation of the user for the subtitle content of the multimedia and the subtitle interaction content; and translate the subtitle content of the multimedia and the subtitle interaction content from an original language into a target language.

In the multimedia interaction apparatus according to one or more embodiments of the present disclosure, the multimedia and the subtitle content are displayed in different areas of the multimedia display interface.

A multimedia interaction apparatus is provided according to one or more embodiments of the present disclosure. The apparatus includes:
an interaction input triggering module configured to receive an interaction input triggering operation, wherein an interactive input to a multimedia and/or an interactive input to a subtitle content of the multimedia is triggered by the interaction input triggering operation;
an interaction data obtaining module configured to obtain interaction input data triggered based on the interaction triggering operation; and
an interaction data display module configured to display, in the multimedia and the subtitle content, the interaction input data in association with the multimedia and the subtitle content.

An information interaction apparatus is provided according to one or more embodiments of the present disclosure. The apparatus includes:
an interaction obtaining module configured to obtain an interaction content for a selected text in a text content from a user; and
an identifier display module configured to display an interaction aggregation identifier in association with a text segment including the selected text, wherein the text content includes at least one text segment, and the text segment including the interaction content is in a one-to-one correspondence with the interaction aggregation identifier.

An electronic device is provided according to one or more embodiments of the present disclosure. The electronic device includes: a processor; and a memory configured to store executable instructions for execution by the processor; wherein the processor is configured to read the executable instructions from the memory, and execute instructions to perform the multimedia interaction method and/or the information interaction method according to any one of the embodiments of the present disclosure.

A computer-readable storage medium is provided according to one or more embodiments of the present disclosure, wherein the storage medium stores a computer program, and the computer program is used to perform the multimedia interaction method and/or the information interaction method according to any of the embodiments of the present disclosure.

The above description includes merely preferred embodiments of the present disclosure and explanations of technical principles thereof. Those skilled in the art should understand that the scope of the present disclosure is not limited to technical solutions formed by the specific combination of technical features, but shall cover other technical solutions formed by any combination of the above technical features or their equivalents without departing from the inventive concept of the present disclosure. For example, a technical solution formed by interchanging the features and technical features having similar functions as disclosed (not limiting) with each other is also covered within the scope of the present disclosure.

In addition, although operations are depicted in a particular order, this should not be construed as requiring the operations to be performed in the particular order as shown or in a sequential order. In a certain circumstance, multitasking and parallel processing may be advantageous. Similarly, although the above discussion provides details in implementations, these should not be construed as limitations on the scope of the present disclosure. Features described in the context of embodiments may be implemented in a combination in a single embodiment, and various features described in the context of a single embodiment may be implemented in multiple embodiments separately or in any suitable sub-combination.

Although the subject matter has been described in language specific to structural features and/or logical acts of a method, it is to be understood that the subject matter defined in the appended claims is not necessarily limited to the specific features or operations described above. The specific features and operations described above are merely exemplary forms for implementing the claims.

The invention claimed is:
1. A multimedia interaction method, comprising:
receiving a triggering operation of a user for a subtitle interaction aggregation identifier on a multimedia display interface, wherein the multimedia display interface displays a multimedia, subtitle content of the multimedia, and the subtitle interaction aggregation identifier, wherein the subtitle interaction aggregation identifier is a prompt identifier to identify interaction content for the subtitle content, the multimedia display interface comprises a subtitle area for displaying the subtitle content of the multimedia, and the subtitle interaction aggregation identifier is displayed in association with the subtitle area; and displaying, on the subtitle area, at least one subtitle interaction content corresponding to the subtitle interaction aggregation identifier, in response to the triggering operation for a subtitle interaction aggregation identifier on a multimedia display interface, wherein the subtitle interaction content indicates interaction content for the subtitle content.

2. The method according to claim 1, wherein before the receiving a triggering operation of a user for a subtitle interaction aggregation identifier on a multimedia display interface, the method further comprises:

in response to that subtitle interaction content input by the user for a target subtitle in the subtitle content is obtained, displaying, on the multimedia display interface, the subtitle interaction aggregation identifier corresponding to the subtitle interaction content.

3. The method according to claim 2, wherein the displaying, on the multimedia display interface, the subtitle interaction aggregation identifier corresponding to the subtitle interaction content comprises:

displaying, on the multimedia display interface, the subtitle interaction aggregation identifier in association with a subtitle segment comprising the target subtitle, wherein a subtitle segment comprising the subtitle interaction content is in a one-to-one correspondence with the subtitle interaction aggregation identifier.

4. The method according to claim 2, further comprising:
distinctively displaying the target subtitle on the multimedia display interface in a set way.

5. The method according to claim 3, wherein the subtitle interaction aggregation identifier includes the number of the subtitle interaction content for an associated subtitle segment, wherein the subtitle interaction content comprises at least one of a comment and a sticker.

6. The method according to claim 3, wherein displaying at least one subtitle interaction content corresponding to the subtitle interaction aggregation identifier comprises:

displaying, in a subtitle interaction window on the multimedia display interface, at least one subtitle interaction content of the subtitle segment associated with the subtitle interaction aggregation identifier.

7. The method according to claim 6, wherein the subtitle interaction window is displayed in association with the subtitle interaction aggregation identifier.

8. The method according to claim 1, further comprising:
displaying at least one multimedia interaction content in a subtitle interaction window, wherein the multimedia interaction content corresponds to a time period corresponding to a subtitle segment associated with the subtitle interaction aggregation identifier.

9. The method according to claim 8, wherein the multimedia interaction content indicates interaction content for the multimedia obtained based on a playback timeline of the multimedia.

10. The method according to claim 8, wherein the multimedia interaction content is generated by:

determining, in response to a reception of interaction content in a creating process of the multimedia, time information when the interaction content is received; and generating the multimedia interaction content based on the interaction content and the time information.

11. The method according to claim 8, wherein the multimedia interaction content is displayed in association with a playback timeline of the multimedia.

12. The method according to claim 1, wherein the subtitle content comprises at least two subtitle segments, and the subtitle segments are obtained by performing semantic split on the subtitle content.

13. The method according to claim 1, further comprising:
receiving a triggering operation of the user for a subtitle interaction prompt identifier on a playback timeline of the multimedia on the multimedia display interface; and displaying the subtitle interaction content corresponding to the subtitle interaction prompt identifier in a subtitle interaction window.

14. The method according to claim 13, wherein after the receiving a triggering operation of the user for a subtitle interaction prompt identifier on a playback timeline of the multimedia on the multimedia display interface, the method further comprises:

controlling the subtitle content of the multimedia to jump to a position of the associated subtitle corresponding to the subtitle interaction prompt identifier, and distinctively displaying the associated subtitle and the subtitle interaction content for the associated subtitle.

15. The method according to claim 1, further comprising:
receiving a triggering operation of the user for a multimedia interaction prompt identifier on a playback timeline of the multimedia in the multimedia display interface; and displaying, in an interactive card associated with the playback timeline, multimedia interaction content corresponding to the multimedia interaction prompt identifier.

16. The method of claim 1, further comprising:
receiving an interaction display triggering operation of the user for a position corresponding to a target time point on a playback timeline of the multimedia; and displaying an interactive card, wherein the interactive card comprises subtitle interaction data of a subtitle corresponding to the target time point, and the subtitle interaction data comprises at least one of the subtitle interaction content and statistical data of the subtitle interaction content.

17. The method according to claim 16, wherein the interactive card further comprises multimedia interaction data for the multimedia at the target time point, and the multimedia interaction data comprises at least one of multimedia interaction content and statistical data of multimedia interaction content.

18. The method according to claim 1, further comprising:
receiving a user operation comprising at least a detection operation or a splitting operation;

in response to the user operation being the deletion operation of the user for a first subtitle segment in the subtitle content; and, deleting the first subtitle segment, and displaying, after the first subtitle segment is deleted, the subtitle interaction aggregation identifier corresponding to the first subtitle segment in an area associated with a historical position of the first subtitle segment; and in response to the user operation being the splitting operation of the user for a second subtitle segment in the subtitle content, splitting the second subtitle segment into at least two subtitle sub-segments in the splitting operation; splitting, based on split subtitle sub-segments, the subtitle interaction content of the second subtitle segment; and determining, in response to the splitting operation, a user identity associated with the split subtitle sub-segments, based on a user identity associated with the second subtitle segment.

19. The method according to claim 1, further comprising:
receiving a triggering operation of the user for a selected subtitle in the subtitle content; and
displaying, in a subtitle interaction window on the multimedia display interface, the subtitle interaction content for the selected subtitle or the subtitle interaction content for the subtitle segment comprising the selected subtitle, wherein the selected subtitle is a subtitle with the subtitle interaction content.

20. The method according to claim 1, further comprising:
receiving a reply operation of the user for the subtitle interaction content;
displaying a reply editing interface, and obtaining subtitle interaction reply content inputted by the user through the reply editing interface; and
displaying the subtitle interaction reply content in association with the subtitle interaction content.

21. The method according to claim 1, further comprising:
receiving a user operation comprising at least a search triggering operation or a translation triggering operation;
in response to the user operation being the search triggering operation of the user for a search keyword, receiving the search keyword, and distinctively displaying a target keyword hit by searching for the search keyword in the subtitle content and the subtitle interaction content; and
in response to the user operation being the translation triggering operation of the user for the subtitle content of the multimedia and the subtitle interaction content, translating the subtitle content of the multimedia and the subtitle interaction content from an original language into a target language.

22. The method according to claim 21, further comprising:
displaying, in a search display area, a total number of hits of the target keyword; and distinctively displaying a currently selected keyword in the target keyword and the search hit prompt identifier corresponding to the currently selected keyword, and displaying a sorting result of the currently selected keyword in the target keyword, wherein the currently selected keyword and the search hit prompt identifier are distinctively displayed in a different way from the target keyword.

23. The method according to claim 22, further comprising:
receiving a jump operation of the user for the currently selected keyword, wherein the jump operation comprises an upward jump or a downward jump; and
displaying a currently selected keyword after jump.

24. The method according to claim 1, wherein the multimedia and the subtitle content are displayed in different areas of the multimedia display interface.

\* \* \* \* \*